US006782409B1

(12) United States Patent
Yoshida

(10) Patent No.: US 6,782,409 B1
(45) Date of Patent: Aug. 24, 2004

(54) EXPERIENCE/SYMPATHY INFORMATION PROVIDING SYSTEM

(75) Inventor: Kimiyoshi Yoshida, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/463,425

(22) PCT Filed: May 28, 1999

(86) PCT No.: PCT/JP99/02862

§ 371 (c)(1),
(2), (4) Date: Jan. 21, 2000

(87) PCT Pub. No.: WO99/63458

PCT Pub. Date: Dec. 9, 1999

(30) Foreign Application Priority Data

May 29, 1998 (JP) .......................... P10-166241

(51) Int. Cl.⁷ ............................................. G06F 15/16
(52) U.S. Cl. ................... 709/201; 709/203; 709/219; 709/226; 705/10; 705/14; 705/27; 707/6; 707/10
(58) Field of Search ................................. 709/201, 203, 709/217, 219, 202, 226; 705/10, 27, 14; 707/6, 104.1, 70, 10; 718/100

(56) References Cited

U.S. PATENT DOCUMENTS

| | | | | | |
|---|---|---|---|---|---|
| 5,749,081 | A | * | 5/1998 | Whiteis ....................... | 707/102 |
| 5,758,257 | A | * | 5/1998 | Herz et al. .................. | 725/116 |
| 5,790,426 | A | * | 8/1998 | Robinson ..................... | 702/179 |
| 5,884,282 | A | * | 3/1999 | Robinson ..................... | 705/27 |

(List continued on next page.)

FOREIGN PATENT DOCUMENTS

| JP | 9-190443 | 7/1997 | ........... G06F/17/30 |
|---|---|---|---|
| JP | 9-265478 | 10/1997 | ........... G06F/17/30 |

OTHER PUBLICATIONS

Shibata, "Net Trend Watcher", NEC Gihou, vol. 49, No. 7, 1996 (Jul. 30, 1996), p. 24–27.
Fisk, D. An Application of Social Filtering to Movie Recommendation. Lecture Notes in Artificial Intelligence (Subseries of Lecture Notes in Computer Science), 1997, vol. 1198, p. 116–131, especially p. 120–122.
Shardanand, U. & Maes, P. Social Information Filtering: Algorithms for Automating "Word of Mouth". SIGCHI'95 (Denver, Colorado, May 7–11, 1995). In Human Factors in Computing System Proceedings, Annual Conference Series, 1995, ACM SIGCHI, pp. 210–217.
Hill, W. et al., Recommending and Evaluating Choices in a Virtual Community of Use. SIGCHI '95 (Denver, Colorado, May 7–11, 1995). In Human Factors in Computing System Proceedings, Annual Conference Series, 1995, ACM SIGCHI, pp. 194–201.

(List continued on next page.)

*Primary Examiner*—Rupal Dharia
*Assistant Examiner*—Melvin H. Pollack
(74) *Attorney, Agent, or Firm*—Sonnenschein Nath & Rosenthal LLP

(57) ABSTRACT

Upon receiving a request for preparing a recommended CD list in Step S71, the experience/sympathy information providing server stores the member ID of the user requested a recommended CD list as remarkable member in Step S72. Then, in Step S73, the experience/sympathy information providing server extracts members having a taste similar to that of the remarkable member as sympathizers (members who like CDs (music) similar to those the remarkable member likes). In Step S74, the experience/sympathy information providing server prepare a synthetic experience/ sympathy list by collecting experience/sympathy element data of the sympathizers. In Step S75; the experience/ sympathy information providing server 14 prepares a recommended experience (CD) list best adapted to the user from the synthetic experience/sympathy list and transmits it to the terminal unit of the remarkable member.

16 Claims, 27 Drawing Sheets

U.S. PATENT DOCUMENTS

| | | | | |
|---|---|---|---|---|
| 5,890,152 A | * | 3/1999 | Rapaport et al. | 707/6 |
| 5,913,204 A | * | 6/1999 | Kelly | 705/500 |
| 5,983,200 A | * | 11/1999 | Slotznick | 705/26 |
| 6,003,020 A | * | 12/1999 | Hazlehurst et al. | 706/11 |
| 6,026,387 A | * | 2/2000 | Kesel | 706/52 |
| 6,041,311 A | * | 3/2000 | Chislenko et al. | 705/27 |
| 6,049,777 A | * | 4/2000 | Sheena et al. | 705/10 |
| 6,064,980 A | * | 5/2000 | Jacobi et al. | 705/26 |
| 6,078,740 A | * | 6/2000 | DeTreville | 703/22 |
| 6,092,049 A | * | 7/2000 | Chislenko et al. | 705/10 |
| 6,112,186 A | * | 8/2000 | Bergh et al. | 705/10 |
| 6,175,831 B1 | * | 1/2001 | Weinreich et al. | 707/10 |
| 6,226,672 B1 | * | 5/2001 | DeMartin et al. | 709/219 |
| 6,236,978 B1 | * | 5/2001 | Tuzhilin | 705/26 |
| 6,353,813 B1 | * | 3/2002 | Breese et al. | 706/12 |
| 6,381,651 B1 | * | 4/2002 | Nishio et al. | 709/245 |
| 6,408,288 B1 | * | 6/2002 | Ariyoshi | 706/22 |
| 6,460,036 B1 | * | 10/2002 | Herz | 707/10 |

OTHER PUBLICATIONS

U.S. patent application Ser. No. 08/980,268, filed Nov. 28, 1997.

U.S. patent application Ser. No. 09/169,505, Oct. 9, 1998.

* cited by examiner

| MEMBER ID | USER A ID | NUMBER OF EXPERIENCE ITEMS | 7 |
|---|---|---|---|

| EXPERIENCE ITEM T | DEGREE OF PREFERENCE K | DATE OF CONTRIBUTION AND OTHER |
|---|---|---|
| CD TITLE 201 | 0.9 | 10:05, Oct, 10, 1998 |
| CD TITLE 202 | 0.2 | 11:11, Oct, 20, 1998 |
| CD TITLE 203 | 0.8 | 04:55, Dec, 15, 1998 |
| CD TITLE 204 | 1.0 | 16:30, Jan, 19, 1999 |
| CD TITLE 205 | 0.1 | 15:45, Feb, 03, 1999 |
| CD TITLE 206 | 0.7 | 20:05, Mar, 04, 1999 |
| CD TITLE 207 | 0.5 | 11:15, Apr, 16, 1999 |

FIG.4

EXPERIENCE/PREFERENCE INTRODUCTION CENTER

WE INTRODUCE RECOMMENDATIONS/
EXPERIENCES OF MANY PERSONS!

PLEASE SPECIFY CONDITIONS FOR
RECOMMENDATION REQUEST.

1. CATEGORY  2. SCOPE OF OUTPUT  4. PREFERENCE LEVEL

| CD | ▼ |
|---|---|
| CD VIDEO | ▲ |
| BOOK | ▼ |

111

○ ALL
○ ONLY STRONGLY RECOMMENDED

3. LIMITATIONS FOR INDIVIDUALS

| 5 |
|---|

⊚ NO INDICATION
○ ONLY IN NUMERICAL VALUE
○ IN LANGUAGE
○ BOTH

| REQUEST |
|---|

EXPERIENCE/PREFERENCE INTRODUCTION CENTER

COLLECTION OF RECOMMENDED CD TITLES

| CD TITLES | RECOMMENDATION LEVEL |
|---|---|
| 1. AAAAA | STRONGLY (1.0) |
| 2. BB | STRONGLY (1.0) |
| 3. CCCCCCCC | ORDINARILY (0.8) |
| 4. DDDD | PLEASE INTRODUCE (0.6) |
| 5. EEEEEE | FOR REFERENCE (0.4) |

FIG.12

EXPERIENCE/PREFERENCE INTRODUCTION CENTER

COLLECTION OF STRONGLY RECOMMENDED CD TITLES

CD TITLES

1. AAAAA
2. BB

FIG.13

EXPERIENCE/PREFERENCE INTRODUCTION CENTER
RECOMMENDED CD TITLES: BEST 5

CD TITLES

1. AAAA
2. BB
3. CCCCCCCC
4. DDDD
5. EEEEE

FIG. 14

| No | EXPERIENCE ITEM T | PREFERENCE LEVEL K |
|---|---|---|
| 1 | CD TITLE 201 | 0.9 |
| 2 | CD TITLE 202 | 0.2 |
| 3 | CD TITLE 203 | 0.8 |
| 4 | CD TITLE 204 | 1.0 |
| 5 | CD TITLE 205 | 0.1 |
| 6 | CD TITLE 206 | 0.7 |
| 7 | CD TITLE 207 | 0.5 |

FIG.18

| No | TASTE SHARING MEMBER ID | TASTE SHARING LEVEL F |
|---|---|---|
| 1 |  | 0 |
| 2 |  | 0 |
| ⋮ |  | 0 ⋮ |
| L |  | 0 |

} TASTE SHARING MEMBER DATA

FIG.19

| No | EXPERIENCE ITEM T | PREFERENCE LEVEL K |
|---|---|---|
| 1 | CD TITLE 203 | 0.7 |
| 2 | CD TITLE 201 | 0.3 |
| 3 | CD TITLE 301 | 0.9 |
| 4 | CD TITLE 302 | 0.2 |
| 5 | CD TITLE 202 | 0.9 |
| 6 | CD TITLE 303 | 0.1 |
| 7 | CD TITLE 304 | 1.0 |
| 8 | CD TITLE 204 | 0.6 |
| 9 | CD TITLE 305 | 0.5 |

FIG.20

| KB \ KA | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0.0 | 0.0 | 0.1 | 0.2 | 0.2 | 0.3 | 0.3 | 0.4 | 0.5 | 0.7 | 0.9 | 1.0 |
| 0.1 | 0.1 | 0.0 | 0.1 | 0.2 | 0.2 | 0.3 | 0.4 | 0.5 | 0.6 | 0.8 | 0.9 |
| 0.2 | 0.2 | 0.1 | 0.0 | 0.0 | 0.1 | 0.2 | 0.3 | 0.4 | 0.5 | 0.7 | 0.8 |
| 0.3 | 0.2 | 0.2 | 0.0 | 0.0 | 0.0 | 0.1 | 0.2 | 0.3 | 0.4 | 0.5 | 0.6 |
| 0.4 | 0.3 | 0.2 | 0.1 | 0.0 | 0.0 | 0.0 | 0.0 | 0.1 | 0.2 | 0.3 | 0.4 |
| 0.5 | 0.3 | 0.3 | 0.2 | 0.1 | 0.0 | 0.0 | 0.0 | 0.1 | 0.2 | 0.3 | 0.3 |
| 0.6 | 0.4 | 0.4 | 0.3 | 0.2 | 0.0 | 0.0 | 0.0 | 0.0 | 0.1 | 0.2 | 0.3 |
| 0.7 | 0.5 | 0.5 | 0.4 | 0.3 | 0.1 | 0.1 | 0.0 | 0.0 | 0.0 | 0.1 | 0.2 |
| 0.8 | 0.7 | 0.6 | 0.5 | 0.4 | 0.2 | 0.2 | 0.1 | 0.0 | 0.0 | 0.1 | 0.2 |
| 0.9 | 0.9 | 0.8 | 0.7 | 0.5 | 0.3 | 0.3 | 0.2 | 0.1 | 0.1 | 0.0 | 0.1 |
| 1.0 | 1.0 | 0.9 | 0.8 | 0.6 | 0.4 | 0.3 | 0.3 | 0.2 | 0.2 | 0.1 | 0.0 |

FIG.22

| No | TASTE SHARING MEMBER ID | TASTE SHARING LEVEL F |
|---|---|---|
| 1 | MEMBER 1's ID1 | F1 |
| 2 | MEMBER 3's ID3 | F2 |
| 3 | MEMBER 2's ID2 | F3 |
| . | . | . |
| . | . | . |
| . | . | . |
| L | MEMBER L's IDL | FL |

TASTE SHARING LEVEL: HIGH ↑ / LOW ↓

FIG.23

| No | TASTE SHARING MEMBER ID | TASTE SHARING LEVEL F |
|---|---|---|
| 1 | MEMBER 1's ID1 | F1 |
| 2 | MEMBER 3's ID3 | F2 |
| 3 |  | 0 |
| . | . | . |
| . | . | . |
| . | . | . |
| L |  | 0 |

TASTE SHARING LEVEL: HIGH ↑ / LOW ↓

FIG.24

| CATEGORY OF TASTE | REQUESTED RECOMMENDATION | ave-min | LIMIT TO NUMBER | PREFERENCE LEVEL |
|---|---|---|---|---|
| CD | BOOK | 0.5 | 5 | all |

EXPERIENCE/SYMPATHY INFORMATION PROVIDING SYSTEM

TECHNICAL FIELD

This invention relates to an information processing apparatus, an information processing method, an information processing system and a recording medium. More particularly, the present invention relates to an information processing apparatus, an information processing method and an information processing system designed to gather and accumulate information concerning tastes of individuals without difficulty and provide service information corresponding to users' tastes and also to a recording medium adapted to such an apparatus.

BACKGROUND ART

It is currently a general practice to prepare and distribute direct mails carrying information on goods and services meeting the tastes of a specific user group. To do this, efforts will have to be paid to gather information on personal tastes typically by means of questionnairs and analyse the obtained data in order to find out the individual tastes of the respondents.

However, the above described conventional method for finding out personal tastes is accompanied by a number of problems. One of such problems is the difficulty of preparing adequate qeustionnaires because they are more often than not rather subjective and the findings can be different among the analysers who analyse the obtained data. Then, it will not be possible to accurately find out personal tastes. Another problem accompanying the conventional method is that the entire project of preparing questionnairs, collecting them and analysing them is very labour intensive and time consuming.

Still another problem is that the personal data obtained from the collected questionnaris can, if partly, be leaked to the outside to infringe on privacy.

DISCLOSURE OF THE INVENTION

In view of the above described circumstances, it is there fore the object of the present invention to provide an information processing apparatus, an information processing method and an information processing system designed to gather and accumulate information concerning tastes of individuals without difficulty and provide service information corresponding to users' tastes as well as a recording medium adapted to such an apparatus.

According to an aspect of the invention, the above object is achieved by providing an information processing apparatus for selecting services to be provided to individual subscribers by way of a plurality of terminal units connected to the apparatus, said apparatus comprising: memory means for storing personal information lists containing personal information including experiences on services; personal information extraction means for comparing the experience information contained in a remarkable piece of personal information and the experience information contained in each of the pieces of personal information contained in said personal information lists and extracting the pieces of personal information strongly related to said remarkable piece of personal information; and selection means for selecting services to be provided to the terminal unit corresponding to said remarkable piece of personal information on the basis of the pieces of personal information extracted by said personal information extraction means.

According to another aspect of the invention, there is provided an information processing method for selecting services to be provided to individual subscribers by way of a plurality of terminal units connected to the apparatus, said method comprising steps of: storing personal information lists containing personal information including experiences on services; comparing the experience information contained in a remarkable piece of personal information and the experience information contained in each of the pieces of personal information contained in said personal information lists and extracting the pieces of personal information strongly related to said remarkable piece of personal information; and selecting services to be provided to the terminal unit corresponding to said remarkable piece of personal information on the basis of the pieces of personal information extracted in said step of extracting personal information.

According to still another aspect of invention, there is provided an information processing system comprising a plurality of terminal units and an information processing apparatus for providing service information to said plurality of terminal units, each of said terminal units having: input means for inputting experience information relating to said service information and request information requesting service information to said information processing apparatus; first communication means for transmitting said experience information and said request information to said information processing apparatus and receiving said service information from said information processing apparatus by way of a network; and display means for displaying the service information received by said first communication means; said information processing means having:
second communication means for receiving experience information and request information from said information processing apparatus and transmitting service information to said plurality of terminal units; memory means for storing a personal information list containing personal information on a plurality of individuals including said service information transmitted from said first communication means of said plurality of terminal units and received by said second communication means;
remarkable personal information extraction means for extracting experience information contained in remarkable personal information relating to said terminal unit used for transmitting said request information from said memory means; related personal information extraction means for extracting personal information strongly related to said remarkable personal information from each pieces of personal information contained in said personal information list by comparing said experience information contained in said remarkable personal information with experience information contained in each pieces of personal information contained in the personal information list stored in said memory means; and selection means for selecting said service information for the terminal unit corresponding to said remarkable personal information on the basis of the personal information extracted by said related personal information extraction means; said second communication means being adapted to transmit said service information selected by said selection means to said terminal unit used to transmit said request information by way of said network.

According to a still another aspect of the invention, there is provided a recording medium storing an information processing program adapted to be read by a computer for selecting services to be provided to a plurality of terminal units; said information processing program being for use for each of the individuals using said plurality of terminal units and adapted to carry out a processing operation comprising steps of: storing personal information lists containing personal information including experiences on services; comparing the experience information contained in a remarkable piece of personal information and the experience information contained in each of the pieces of personal information contained in said personal information lists and extracting the pieces of personal information strongly related to said remarkable piece of personal information; and selecting services to be provided to the terminal unit corresponding to said remarkable piece of personal information on the basis of the pieces of personal information extracted in said step of extracting personal information.

BRIEF DESCRIPTION OF THE DRAWINGS

FIG. 4 is an example of personal experience/sympathy record.

FIG. 11 is still another example of GUI display of the terminal unit of FIG. 3.

FIG. 12 is an example of display of recommended experience information of the terminal unit of FIG. 3.

FIG. 13 is another example of display of recommended experience information of the terminal unit of FIG. 3.

FIG. 14 is still another example of display of recommended experience information of the terminal unit of FIG. 3.

FIG. 18 is an example of remarkable personal experience/sympathy list.

FIG. 19 is an example of sympathizers' buffer.

FIG. 20 is an example of comparable member's experience/sympathy list.

FIG. 22 is an example of lookup table.

FIG. 23 is another example of sympathizers' buffer.

FIG. 24 is still another example of sympathizers' buffer.

BEST MODES FOR CARRYING OUT THE INVENTION

Now, the present invention will be described by referring to the accompanying drawings that illustrate some of the best modes for carrying out the invention.

Figure 1:
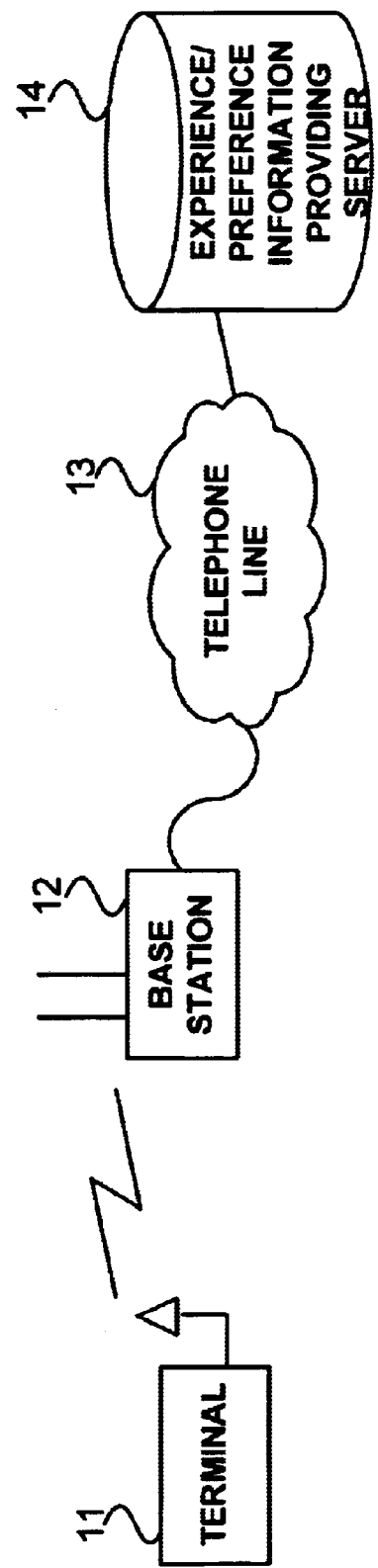
FIG. 1 is a schematic block diagram of a network of a experience/sympathy information providing server to which the present invention is applicable.

FIG. 1 schematically illustrates some of the elements of a network of an experience/sympathy information providing server realized by applying the present invention. Referring to FIG. 1, terminal 11 is a communication terminal conforming to the PIAFS (Personal Handy-phone System Internet Access Forum Standard) and equipped with functions necessary for accurately notifying the experience/sympathy information providing server 14 of the demand of the user (subscriber) at the terminal by way of a user interface and accurately conveying the message of the experience/sympathy information providing server 14 to the user. Thus, the terminal 11 typically comprises a bit map display and a touch panel (not shown). The terminal 11 can communicate with base station 12 wirelessly by way of a PHS (personal handy-phone system) unit contained in it as integral part thereof and operating as interface and access the experience/sympathy information providing server 14 by way of telephone line 13 connected to the base station 12 in order to receive services from the experience/sympathy information providing server 14.

The experience/sympathy information providing server 4 is connected to the telephone line 13.

While the above described user interface of the terminal 11 may be arranged in the terminal 11, the one transmitted from the experience/sympathy information providing server 14 in the form of HTML data may alternatively be utilized if the terminal 11 has a Web viewer function.

Figure 2:
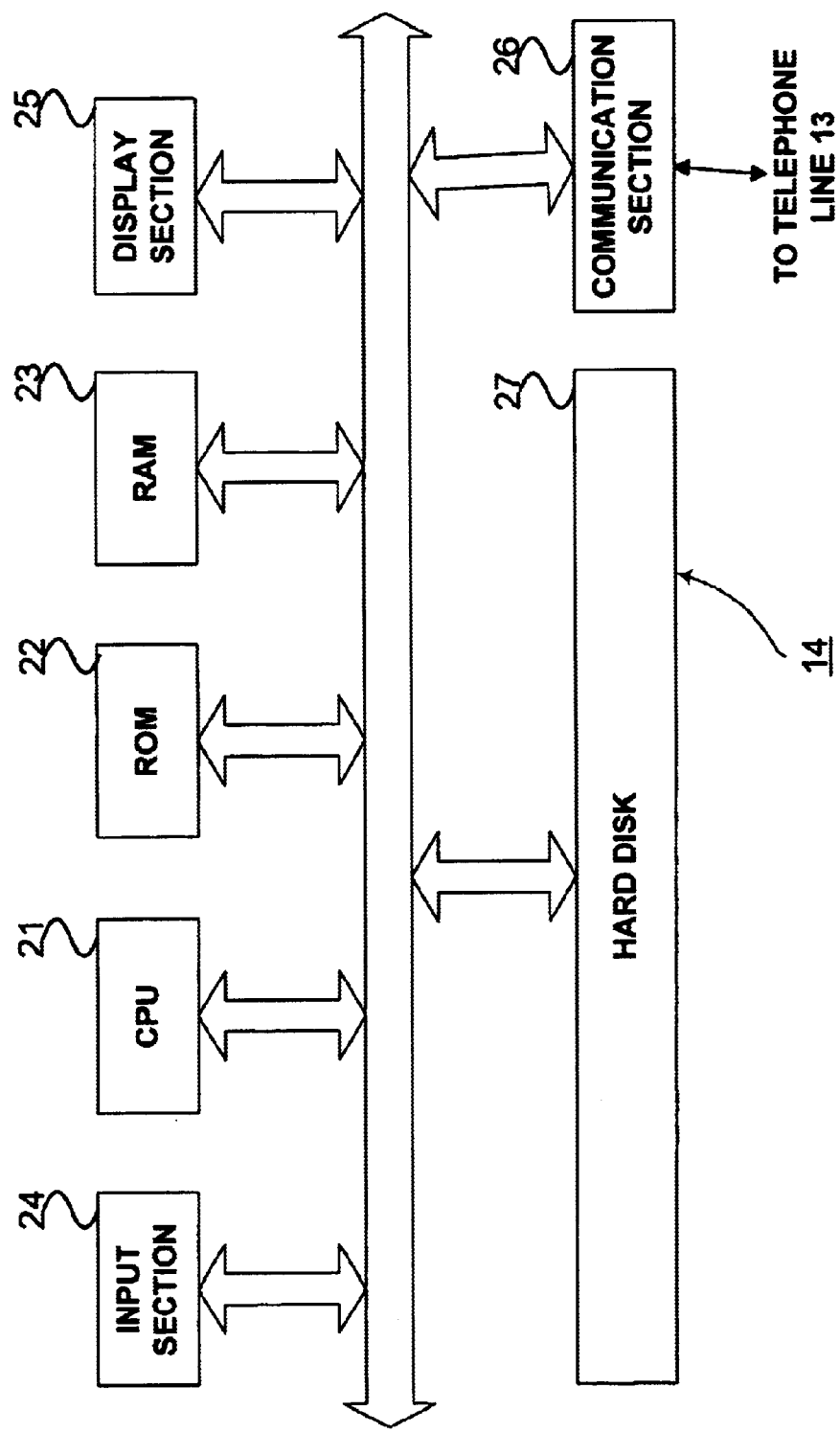
FIG. 2 is a schematic block diagram of the experience/sympathy information providing server of FIG. 1, illustrating the internal configuration.

FIG. 2 is a block diagram of the experience/sympathy information providing server 14, showing a possible configuration thereof. Referring to FIG. 2, CPU 21 is designed to carry out various processing operations according to the programs stored in ROM 22 or hard disk 27.

The ROM 22 stores various programs and data. RAM 23 is adapted to store programs and data in predetermined memory areas in response to the processing operations carried out by the CPU 21.

Input section 24 including a keyboard and a mouse will be operated by the person in charge of the experience/sympathy information providing server 14 for entering a command to the CPU 21. Display section 25 typically comprises a liquid crystal display for displaying various pieces of information.

Communication section 26 is used to receive various requests and data from terminals 11 by way of telephone lines 13 and output the data supplied from the CPU 21 to telephone lines 13.

Hard disk 27 stores server programs and personal experience/sympathy records on each of the subscribers (users of terminals 11) of the experience/sympathy information management system controlled by the experience/sympathy information managing firm who possesses the experience/sympathy information providing server 14.

Figure 3:
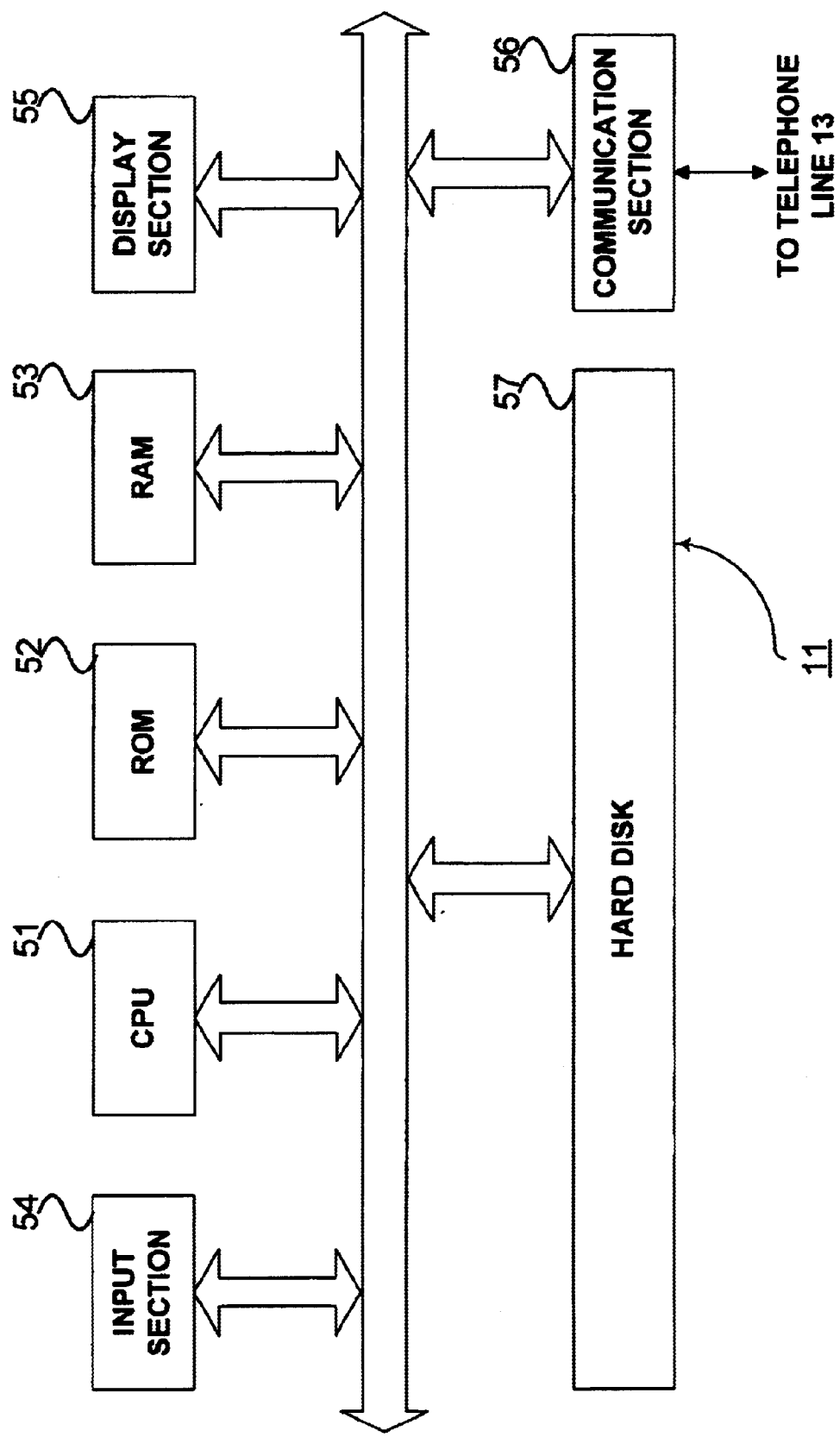
FIG. 3 is a schematic block diagram of a terminal unit of the network of FIG. 1, illustrating the internal configuration.

FIG. 3 is a schematic block diagram of the terminal 11 of FIG. 1, showing a possible configuration thereof. CPU 51 is designed to carry out various processing operations according to the programs stored in ROM 52 or hard disk 57.

The ROM 52 stores various programs and data. RAM 53 is adapted to store programs and data in predetermined memory areas in response to the processing operations carried out by the CPU 51.

Input section 54 including a keyboard and a mouse will be operated by the user at the terminal 11 entering a command to the CPU 21. Display section 55 typically comprises a liquid crystal display for displaying various pieces of information.

Communication section 56 is constituted by a PIAFS interface and used to receive information of various types from the experience/sympathy information providing server 14 by way of the telephone network 13 and the base station 12 and output data supplied from the CPU 51 to the base station 12.

Hard disk 57 stores server programs and information provided by the experience/sympathy information providing server 14.

FIG. 4 illustrates an example of information that may be stored in personal experience/sympathy record R in the data base formed in the hard disk 27 of the experience/sympathy information providing server 14. The personal experience/sympathy record R contains a plurality of experience/sympathy element data E and experience/sympathy management data C. The experience/sympathy element data E include experience items T (titles of CDs (compact disks) actually experienced (or heard) by members and sympathy levels K corresponding to the respective experience items. There may be a total of 11 sympathy levels K ranging from 0.0 representing the lowest sympathy level to 1.0 representing the highest sympathy level so that the extent of sympathy of each experience may be digitized. As seen in FIG. 4, the sympathy level K of the CD tittle 201 in the experience items is 0.9.

Referring to the example of FIG. 4, a total of seven experience/sympathy element data El through E7 are stored in the personal experience/sympathy record R. If new experience/sympathy element data Ei (where i=8, 9, 10, . . . ) is contributed to the experience/sympathy information providing server 14 by a member, the personal experience/sympathy record R will be updated and the new experience/sympathy element data E1 will be stored in the record R. A experience/sympathy element data E may include the date when it is recorded in the personal experience/sympathy record R (date of contribution) and other attributes as shown in FIG. 4. In FIG. 4, for instance, the date of contribution of the CD title 201 is 10:05, Oct. 10, 1998.

For the purpose of controlling the memory capacity of the hard disk 27, the maximum number of experience/sympathy element data E that can be stored in the personal experience/sympathy record R (hereinafter to referred to as maximum memory item number Ne max of experience/sympathy element data E) is predetermined and hence limited.

The experience/sympathy management data C include member ID for identifying the member who provided experience/sympathy element data E and experience item number Ni indicating the number of experience/sympathy element data E. In the example of FIG. 4, the experience/sympathy management data C include the ID of the user A as member ID and 7 for the experience item number Ni.

Now, the operation of registering a member in the experience/sympathy information management system controlled by an experience/sympathy information managing firm will be described.

Upon receiving a request for accepting a new member registration from a terminal 11 (user), the CPU 21 of the experience/sympathy information providing server 14 provides information on the form of letter of contract to be exchanged between the firm and the user, the system management rules and so on. Then, when the CPU 21 of the experience/sympathy information providing server 14 receives an electronically signed letter of contract and information on personal identification such as a password from the user, it carries out a creditability research necessary for the user and temporarily stores the received information in the RAM 23 until the creditaibility of the user is verified by the creditability research. If the outcome of the creditability research is positive, the CPU 21 of the experience/sympathy information providing server 14 assigns a password to the terminal 11 (user) and authorizes the registration of the information temporarily stored in the RAM 23 to the data base of the hard disk 27 to complete the registration of the new member.

Figure 5:
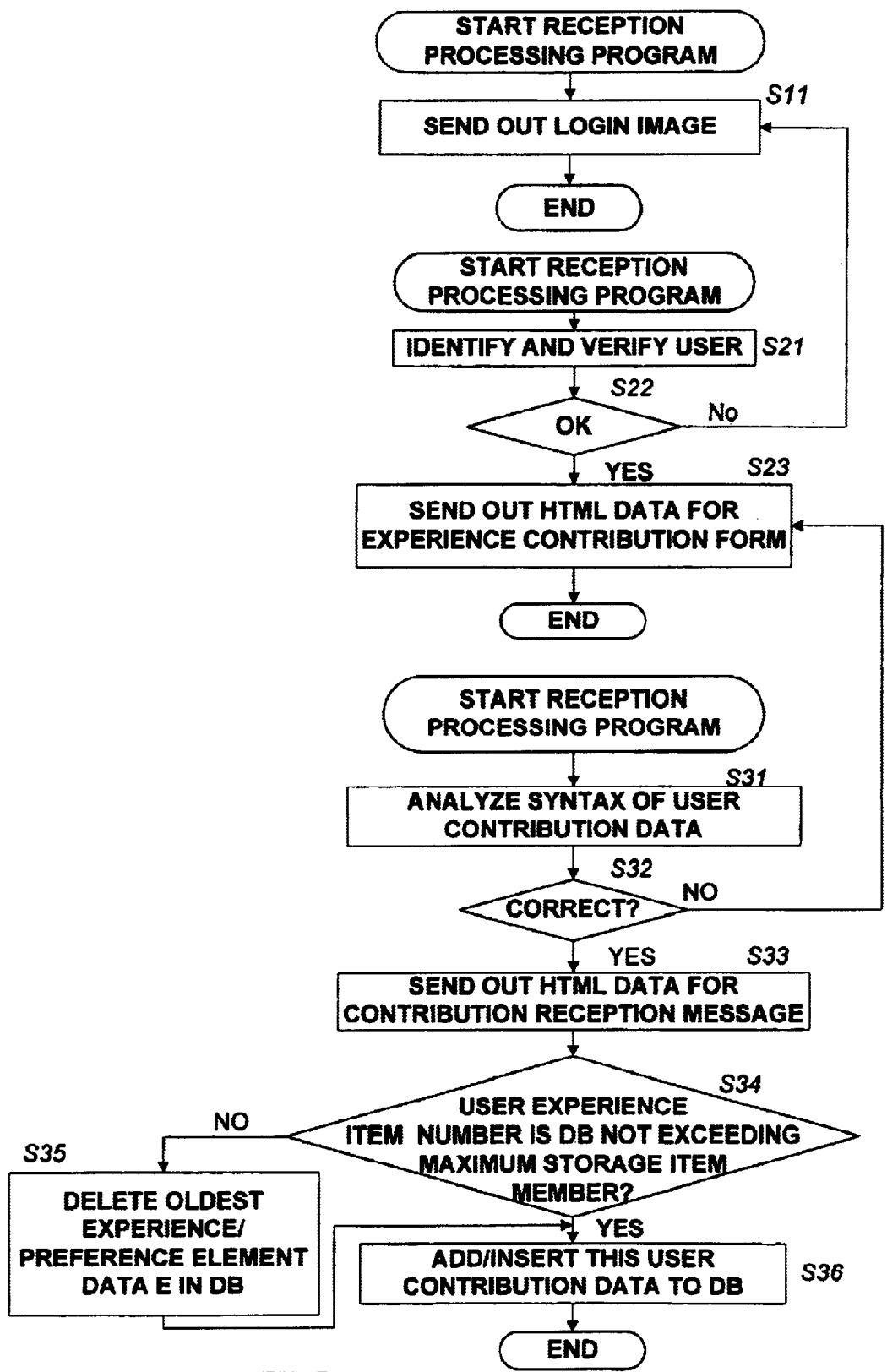
FIG. 5 is a flow chart for the operation of the experience/sympathy information providing server of FIG. 1 for receiving a contribution.

Then, the user (terminal 11) registered in the file of the experience/sympathy information providing server 14 in a manner as described above can contribute articles on experience/sympathy information of various types to the experience/sympathy information providing server 14. The processing operation that proceeds for such a contribution will be described below by referring to the flow chart of FIG. 5.

Figure 6:
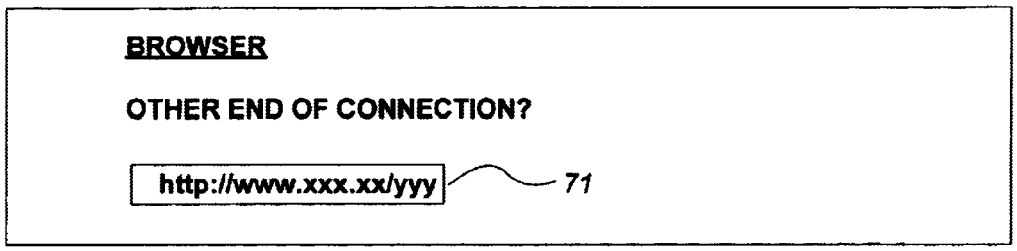
FIG. 6 is an example of GUI display of the terminal unit of FIG. 3.

The contributing user activates the browser to be used for accessing the experience/sympathy information providing server 14 by operating the input section 54 of the terminal 11. At this time, the CPU 51 causes the display section 55 to display an image of the GUI (graphical user interface) to be used for the access as shown in FIG. 6. Then, the user inputs an URL (uniform resource locator) for accessing the experience/sympathy information providing server 14 to the input column 71 of the opposite end of the connection. As the command for starting the connection is issued, the CPU 51 controls the communication section 56 so as to access the URL (experience/sympathy information providing server 14) input to the input column 71.

When accessed by the terminal 11, the CPU 21 of the experience/sympathy information providing server 14 activates the reception processing program and controls the communication section 26 so as to make the latter transmit the HTML (hypertext markup language) on the login image to the terminal 11 in Step S11. When the operation of transmitting the data on the login image is over, the CPU 21 temporarily terminates the operation of the reception processing program.

Figure 7:
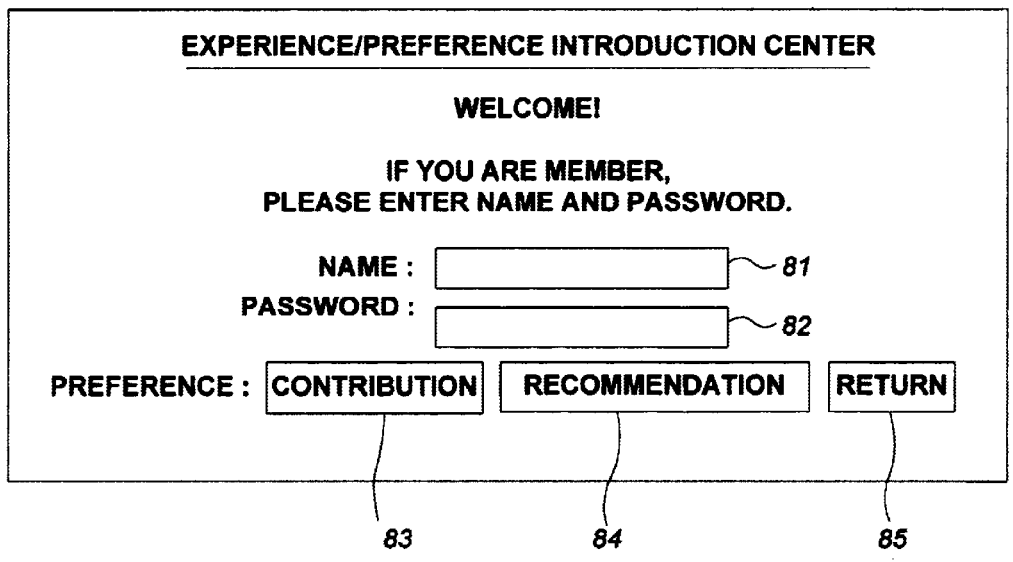
FIG. 7 is another example of GUI display of the terminal unit of FIG. 3.

Upon receiving the HTML data of the login image by way of the communication section 56, the CPU 51 of the terminal 11 processes it appropriately and causes the display section 55 to display an image of the GUI for the contribution form as shown in FIG. 7. Then, the user will input his or her own name into the input column by operating the input section 54 and also input the password assigned to the user as a result of the registration into the input column 82. If the user actually contributes an article, he or she operates the mouse of the input section 54 to turn on the contribution button 83. If the user wants to receive information on recommendation, he or she will operates the recommendation button 84. To return to the original GUI image, which may be the description of a summary of the provided services, the return button will be operated.

Assume here that, after entering the name and the password into the respective input columns 81, 82 the user operated the contribution button 83. Then, CPU 51 of the terminal 11 outputs a request for receiving a contribution with the name and the password.

Upon receiving the request by way of the communication section 26, the CPU 21 of the experience/sympathy information providing server 14 reactivates the reception processing program and, in Step S21, it identifies the user and verify the user identification. More specifically, the CPU 21 determines if the name and the password of the user that have been input are found in the data base of the hard disk 27 or not (if the outcome of the user identification and the verification of the user identification is positive or negative). If not (if the outcome of the user identification and the verification of the user identification is negative), it returns to Step S1, where it transmits the login image to the user once again.

If, on the other hand, the name and the password of the user are found in the data base of the hard disk 27 (if the outcome of the user identification and the verification of the user identification is positive), the CPU 21 proceeds to Step S23, where it transmits the HTML data in the experience contribution form to the terminal 11 and terminates the operation.

Figure 8:
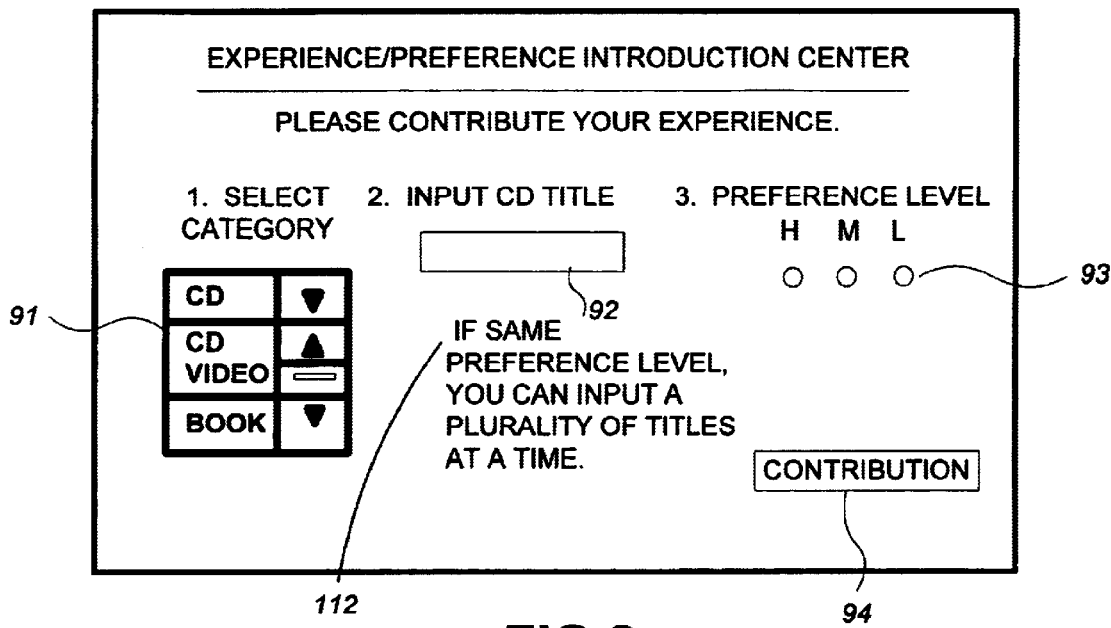
FIG. 8 is still another example of GUI display of the terminal unit of FIG. 3.

Upon receiving the HTML data in the experience contribution form by way of the communication section 56, the CPU 51 of the terminal 11 appropriately processes the data and makes the display section 55 display a GUI image as shown in FIG. 8. In this GUI image, the user is prompted to select a desired category from the listed categories including CD, video and book in the category selection column 91. Thus, the user will selects the category of his or her experience contribution. If the user selects the category CD in the input column for his or her experience contribution, then the user input the title of the CD in the input column 92. Then, the user inputs the sympathy level he or she has for the CD in the input column 93, the title of which CD the user has already input in the input column 92. In the illustrated example, the user selects high (H), middle (M) or low (L). After completing the input operation using the columns 91 through 93, the user operates the contribution button 94. At this time, the CPU 51 controls the communication section 56 to make it output a request for registering the experience contribution data to the experience/sympathy information providing server 14 with the entered experience contribution data and the member ID.

Upon receiving the request by way of the communication section 26, the CPU 21 of the experience/sympathy information providing server 14 starts the reception processing program and, in Step S31, analyses the syntax of the user's contribution data received from the terminal 11. More specifically, the CPU 21 checks if right data are correctly entered to the three input columns shown in FIG. 8 and, if right data are not correctly entered, it returns to Step S23, where it once again sends out the HTML data for the experience contribution form to the terminal 11.

If the CPU 21 determines that right data are entered correctly in Step SS32, the CPU 21 proceeds to Step S33, where it controls the communication section 26 so as to make it transmit HTML data for the reception of the contribution.

Figure 9:
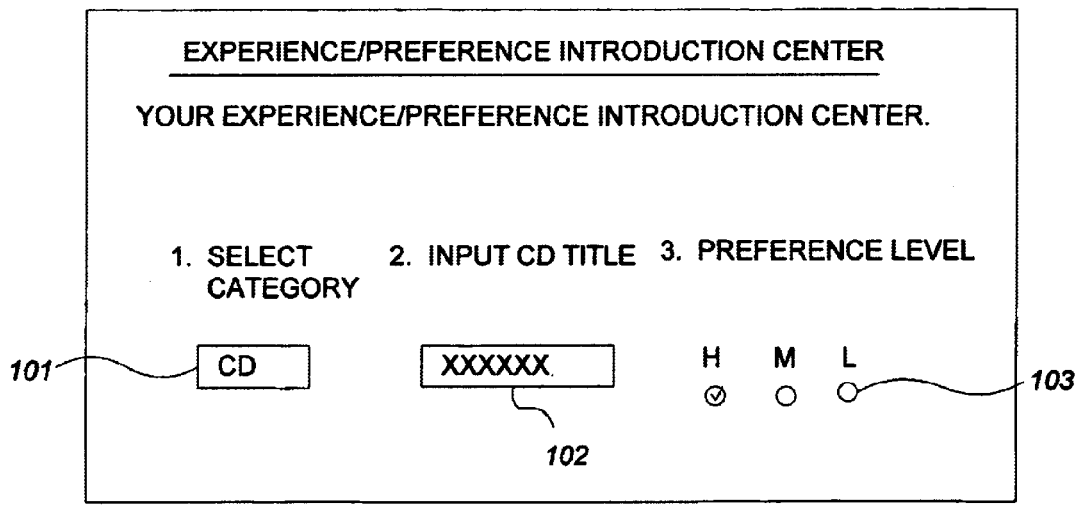
FIG. 9 is an example of message of the terminal unit of FIG. 3.

As the terminal 11 of the CPU 51 receives the HTML data for the reception of the contribution by way of the communication section 56, it appropriately processes the data and causes the display section 55 to display a GUI image as shown in FIG. 9. In this example, the category (CD) specified by the user in the input column 92 as shown in FIG. 8 will be displayed on the display section 101 of the display screen. Additionally, the CD title entered by the user into the input column 92 of FIG. 8 will be displayed on the display section 102 of the display screen. Still additionally, the sympathy level input by the user into the input column 93 of FIG. 8 will be displayed on the display section 103 of the display screen. In this way, the information on the experience/sympathy of the user input by the user him- or herself is confirmed by the experience/sympathy information providing server 14.

Meanwhile, the CPU 21 of the experience/sympathy information providing server 14 checks if the number of experience items Ni of the user found in the member's personal experience/sympathy information data base (DB) in the hard disk 27 exceeds a maximum storage item number Ne max or not in Step S34. If the number of experience item number Ni does not get to the maximum storage item number Ne max yet, it proceeds to Step S36, where it adds and inserts the user's contribution data transmitted from the terminal 11 into the data base. If, on the other hand, it is determined in Step S34 that the maximum storage item number is reached by the experience/sympathy element data E of the user, the CPU 21 proceeds to Step S35, where it delete the oldest experience/sympathy element data E of the user stored in the data base by referring to the dates of the contributions made in the past. Then, it moves to Step SS36, where it adds and inserts the user's contribution data transmitted from the terminal 11 into the data base to have it stored in place of the deleted experience/sympathy element data E.

In this way, the user can contribute his or her own personal experience/sympathy information to the experience/sympathy information providing server 14 and have it registered there through the terminal 11.

The user who has contributed his or her own experience/sympathy information (taste) then can receive information (service) that matches his or her taste from the experience/sympathy information providing server 14. For receiving such service, the user operates the recommendation button 84 instead of the contribution button 83 in FIG. 7. Then, the CPU 21 of the experience/sympathy information providing server 14 executes the processing operation shown in the flow chart of FIG. 10 instead of the processing operation from Step S21 on in FIG. 5.

Figure 10:
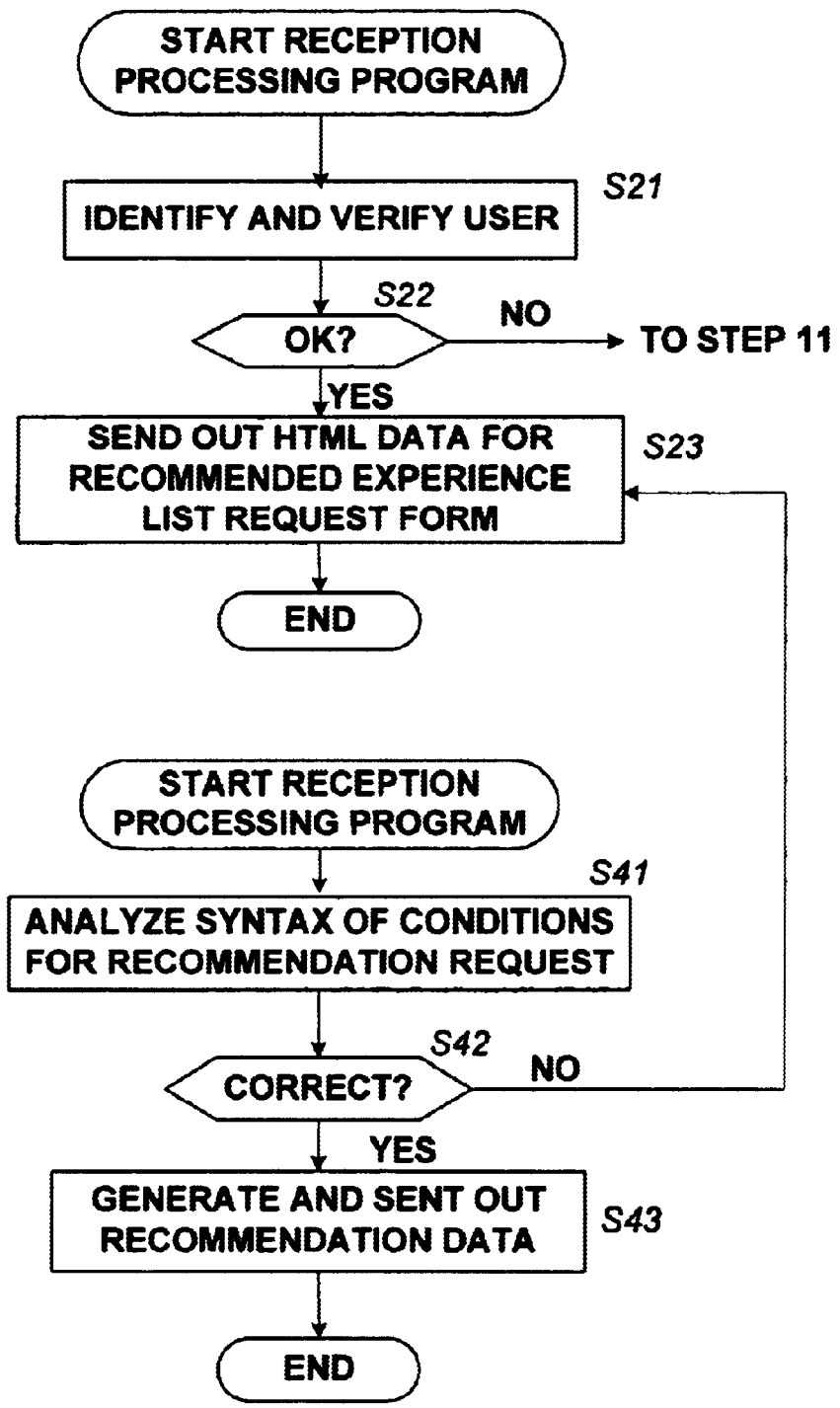
FIG. 10 is a flow chart of the operation of the experience/sympathy information providing server of FIG. 2.

Referring to the flow chart of FIG. 10, if the outcome of the user identification and the verification of the user identification is positive, the CPU 21 of the experience/sympathy information providing server 14 transmits not the HTML data for the experience contribution form but the HTML data for the recommended experience list request form to the terminal 11 in Step S23. As a result, the CPU 51 of the terminal 11 causes the display section 55 to display a GUI image for requesting preparation of a recommended experience list as shown in FIG. 11.

In the example of FIG. 11, the user will input the category of information such as CD, video or book for which the user requests recommendation. Only either "all" or "only strongly recommended" will be input to the input column 112 for the scope of output. The maximum number of CDs, video tapes or books that the user wants to be recommended and shown at the terminal 11 by the experience/sympathy information providing server 14 will be input to the input column 113. Then, one of "no indication", "only in numerical value", "in language" and "both" will be selected and input to the input column 114 as mode of displaying the sympathy level for the recommendation of the experience/sympathy information providing server 14. The request button 115 will be operated when the input operation on the part of the user is completed.

Upon receiving the request for generating recommendation data with the password from the terminal 11, the CPU 21 of the experience/sympathy information providing server 14 starts the reception processing program and, in Step S41, analyses the syntax of the conditions to be met for the request received from the terminal 11. Then, in Step S42, the spu 21 determines if the outcome of the syntax analysis is correct or not. If it is found that the syntax analysis is not correct, the CPU 21 returns to Step S23, where it executes the operation of transmitting the HTML data for the recommended experience request form once again. If it is found that the syntax analysis is correct in Step S42, the CPU 21 proceeds to Step S43, where it prepares a recommended experience list and transmits it to the terminal 11.

In FIGS. 12 through 14, the experience/sympathy information providing server 14 shows examples of recommended experience lists that can be prepared in Step S43 by the CPU 21 of the experience/sympathy information providing server 14. It is assumed here for FIGS. 12 through 14 that the user selected CD for the category of information the user wants by means of the input column 111 of FIG. 11.

The example of FIG. 12 shows a case where the user selected "both" for the sympathy level display column 114 in FIG. 11. Thus, the recommendation will be expressed both in the language of the system and in a numerical value. In other words, if "only in numerical value" is selected by the user, only a numerical value of "1.0" will be displayed for the level of recommendation for the CD title "AAAAA". If "in language" is selected by the user, only "strongly" will be displayed for the level of radius of curvature for the CD title. To the contrary, if "both" is selected by the user, "strongly (1.0)" will be displayed for the level of recommendation, using both the language of the system and a numerical value as shown in FIG. 12. Additionally, since "all" is selected by the user for the scope of output by way of the input column 112 in FIG. 11, all the CDs recommended by the experience/sympathy information providing server 14 will be displayed on the screen as seen from FIG. 12.

The example of FIG. 13 shows a case where the user selected "only strongly recommended" for the scope of output by way of the input column 112 along with "no indication" for the sympathy level for the recommendation data to be displayed. Since "only strongly recommended" is selected in this example, the CDs with the lower levels of recommendation of "ordinarily", "only introducing" and "for reference in FIG. 11 are not shown and only the CDs with the highest level of recommendation of "strongly" are listed in FIG. 13. Additionally, since "no indication" is selected by the user in FIG. 11 by way of the input column 114 in FIG. 11, only the CD titles are displayed in FIG. 13 and the level of recommendation is not indicated in the language nor in a numerical values.

The example of FIG. 14 shows a case where the user enters "5" for the limitation for the number of individuals by way of the input column 113 and "no indication" for the sympathy level by way of the input column 114 in FIG. 11 for the recommendation data to be displayed. In will be seen that five CDs are selected with the descending order of the recommendation levels and displayed with the CD titles.

Figure 15:
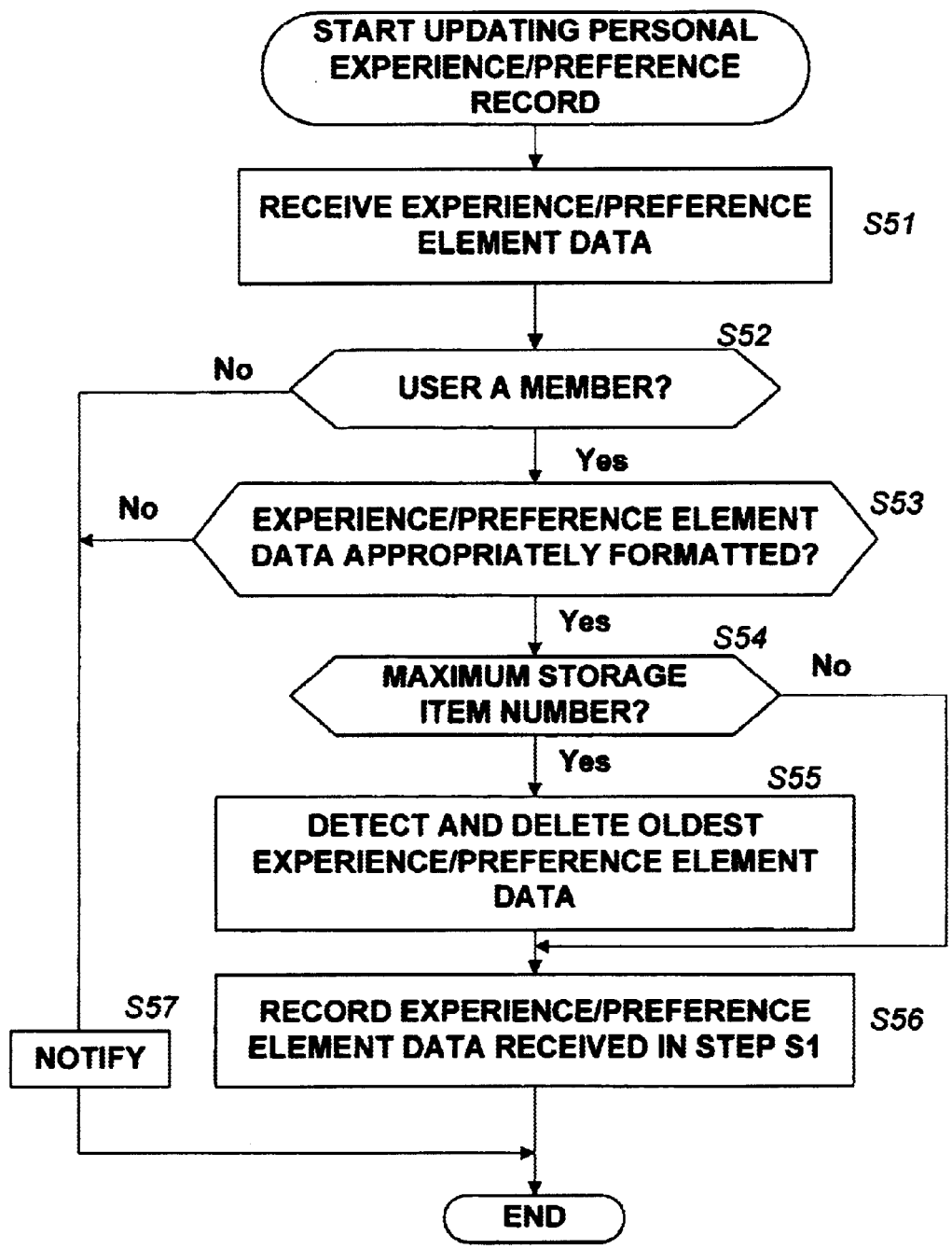
FIG. 15 is a flow chart of the operation of updating a personal experience/sympathy record.

Of the above processing operation, the sequence of operation followed by the CPU 21 of the experience/sympathy information providing server 14 for updating the personal experience/sympathy record R will be described further by referring to the flow chart of FIG. 15.

As discussed above, as the user A who is already registered to the experience/sympathy information management system as member and whose personal experience/sympathy record R is already stored in the data base within the hard disk 27 operates the terminal 11 according to the GUI image to access the experience/sympathy information providing server 14 by way of the telephone line 13 and transmit (contribute) new experience/sympathy element data Ei with his or her member ID, the CPU 21 of the experience/sympathy information providing server 14 receives the new experience/sympathy element data Ei transmitted from the terminal 11 by way of the communication section 26 and temporarily stores the data in the RAM 23 in Step S51.

Then, in Step S52, the CPU 21 determines if the user A who transmitted the experience/sympathy element data Ei is member of the experience/sympathy information management system or not by comparing the member ID sent from the user A with the member ID stored in the personal experience/sympathy record R for the user A (FIG. 4). If it is determined that the user A is member of the experience/sympathy information management system, the CPU 21 proceeds to Step S53. In Step S53, the CPU 21 determines if the transmitted experience/sympathy element data E is a data formatted correctly and contains, for example, both data for experience item T and data for sympathy level K so that it may be properly added to the personal experience/sympathy record R.

If it is determined in Step S53 that the experience/sympathy element data Ei received in Step S51 is a correctly formatted data, the CPU 21 proceeds to Step S54, where it determines if the personal experience/sympathy record R stored in the hard disk 27 already contains experience/sympathy element data Ex for the maximum storage item number Ne max or not. If it is determined that the personal experience/sympathy record R already contains experience/sympathy element data experience/sympathy for the maximum storage item number Ne max, the CPU 21 proceeds to Step S55.

In Step S55, the CPU 21 detects the experience/sympathy element data Ek that is stored with the oldest date among the experience/sympathy element data Ex contained in the personal experience/sympathy record R of the user A and deletes it. Then, in Step S56, the CPU 21 stores the experience/sympathy element data Ei received in Step S51 in the personal experience/sympathy record R of the user. Therefore, now, the experience/sympathy element data Ei received in Step S51 is stored in the personal experience/ sympathy record R in place of the experience/sympathy element data Ek deleted in Step S55.

If, on the other hand, it is determined in Step S54 that the number of experience/sympathy items Ni recorded in the personal experience/sympathy record R of the user does not get to the maximum storage item number Ne max yet, the CPU 21 proceeds to Step S56, where it simply adds the experience/sympathy element data Ei received in Step S51 to the personal experience/sympathy record R.

If, on the other hand, it is determined in Step S52 that the user is not member of the experience/sympathy information management system or it is determined in Step S53 that the experience/sympathy element data Ei received in Step S51 is not correctly formatted, the CPU 2 proceeds to Step S57, where it controls the communication section 26 to notify the terminal 11 of the finding. Then, the user will repeat the contribution procedure in response to the notification. Note that the experience/sympathy element data Ei transmitted from the user A and temporarily stored in the RAM 23 in Step S51 will be erased from the RAM 23 when the above processing operation is completed.

In this way, the experience/sympathy element data Ei contributed by the member is added to the personal experience/sympathy record R of the user to update the record R.

According to the above description, a maximum storage item number Ne max is set for experience/sympathy element data E storable in the personal experience/sympathy record R and the oldest experience/sympathy element data E is replaced by the newly contributed experience/sympathy element data E in order to control the resource (memory capacity) of the hard disk 27, although other technique may alternatively be used for controlling the resource of the hard disk 27. For example, newspaper clippings may become useless to the user after many years. Therefore, particularly when experience/sympathy element data E include newspaper clippings as experience items, it may alternatively be so arranged that the maximum storage period is set for the experience/sympathy element data E stored in the personal experience/sympathy record R and any experience/ sympathy element data E stored in the personal experience/ sympathy record R for more than the maximum storage period will be deleted from the record.

The user may contributes more than one experience/ sympathy element data E at a time by operating the terminal 11 according to the corresponding user interface.

Now, the processing procedure of the experience/ sympathy information providing server 14 for preparing a recommended experience list will be discussed further in terms of an occasion where it receives recommendation for CDs that satisfy the user's taste. This procedure will be firstly described summarily by referring to the flow chart of FIG. 16.

The user A who has already registered a personal experience/sympathy record R as shown in FIG. 4 to the experience/sympathy information providing server 14 may operate the input screen 54 of the terminal 11 (specify one or more than one CDs by way of the input column 111 of the GUI image shown in FIG. 11 and also appropriate items by way of the input columns 112 through 114 and turn on the request button 115), then the CPU 51 of the terminal 11 controls the communication section 56 to make it transmit a request for preparing a recommended CD list to the experience/sympathy information providing server 14 by way of the telephone line 13. The CPU 51 of the terminal 11 will of course make the request contain the member ID of the user. Then, in Step S71, the CPU 21 of the experience/ sympathy information providing server 14 receives the transmitted request for preparing a recommended CD list from the terminal 11 by way of the communication section 26.

Thereafter, in Step S72, the CPU 21 selects the user A with the member ID who transmitted the request for a recommended CD list as remarkable member and stores the member ID of the remarkable member in the RAM 23.

Then, in Step S73, the CPU 21 extracts members having a taste similar to that of the user A who is now a remarkable member. More specifically, it extracts members who also like CDs (music) for which the user has a strong taste (the processing operation for this extraction will be discussed in detail hereinafter).

Then, in Step S74, the CPU 21 collects experience/ sympathy element data E of the members who are extracted in Step S73 and have a taste similar to that of the user A and prepares a synthetic experience/sympathy list (the processing operation for this preparation will be discussed in detail hereinafter).

Thereafter, in Step S75, the CPU 21 prepares a recommended experience (CD) list suited to the user A from the synthetic experience/sympathy list prepared in Step S74 and transmits it to the terminal 11. Then, the processing operation will be terminated.

In this way, a recommended experience (CD) list that is suited to the user is prepared and supplied to the user who requested such a list.

Now, the operations in Steps S73 through 75 above will be discussed in greater detail. Firstly, the operation of extracting persons with a similar taste in Step S73 will be discussed by referring to the flow chart of FIG. 17.

Firstly, in Step S101, the CPU 21 of the experience/ sympathy information providing server 14 reads out the personal experience/sympathy record R corresponding to the member ID of the member selected as remarkable member (who requested a recommended CD list) in Step S72 from the hard disk 27 and write the experience/ sympathy element data E contained in the personal experience/sympathy record R onto remarkable member's personal experience/sympathy list 23A. Then, the CPU 21 stores it in the RAM 23. FIG. 18 shows a remarkable member's personal experience/sympathy list 23A that can be prepared in this way. In this example, the experience/ sympathy element data E contained in the personal experience/sympathy record R of the user A as shown in FIG. 4 are listed on the remarkable member's personal experience/sympathy list 23A with numbers allocated to them for the purpose of controlling the data.

Then, in Step S102, the CPU 21 initializes the buffer 23B in the RAM 23 for storing the member IDs of the members who are determined to be sharing the taste of the user A (hereinafter referred to as sympathizers) and their taste sharing levels F (the member IDs of the sympathizers and their taste sharing levels are collectively referred to as sympathizer data hereinafter). Once the sympathizers' buffer 23B is initialized, no data will be found in the column for listing the member IDs of the sympathizers and only 0 is written in the column for listing taste sharing levels F. The maximum number of items of sympathizer data (hereinafter referred to as the maximum storage item number Nf max of sympathizer data) that can be stored in the sympathizers' buffer 23B is predetermined.

Then, in Step S103, the CPU 21 selects members to be examined for the taste shared by the user A and hence for sympathizer qualification (hereinafter referred to as comparable members) and stores the member IDs of the comparable members in comparable member ID buffer 23C (not shown). Assume here that user B is selected as comparable member. (It may be so arranged that comparable members are selected on the basis of age group and residential area in Step S103.)

Then, in Step S104, the CPU 21 reads out the personal experience/sympathy record R of the selected comparable member (user B) with the member ID stored in the comparable member ID buffer 23C in Step S103 and writes the experience/sympathy element data of the member in comparable member's experience/sympathy list 23D stored in the RAM 23. FIG. 20 shows a comparable member's experience/sympathy list 23D that can be prepared in the above described operation. The data stored in the comparable member's experience/sympathy list 23D corresponds to the experience/sympathy element data E in the personal experience/sympathy record R of the user B who is now comparable member. In this example, the data contains the CD titles 201 through 204 of the CDs listened to by the user B and the CD titles 301 through 305 as well as the sympathy levels of the respective CDs.

Then, in Step S105, the CPU 21 determines the taste sharing level F of the remarkable member (user A) and the comparable member (user B) on the basis of the data stored in the remarkable member's experience/sympathy list 23A (FIG. 18) (the experience/sympathy element data E of the user A) and the data stored in the comparable member's experience/sympathy list 23D (FIG. 20) (the experience/sympathy element data E of the user B).

The processing operation of determining the taste sharing level F in Step S105 will be described in greater detail by referring to the flow chart of FIG. 21.

Firstly, in Step S201, the CPU 21 of the experience/sympathy information providing server 14 determines the experience sharing ratio P1 of the remarkable member and the comparable member by using formula (1) below. The experience sharing ratio P1 is obtained by dividing the number M of experience items shared by the remarkable member and the comparable member (hereinafter referred to as shared experience items TP) by the total number Nm of the experience items of the remarkable member. Therefore, the experience sharing ratio P1 increases as the number of CDs to which both the remarkable member and the comparable member have listened to.

$$P1 = M/Nm \tag{1}$$

As will be clearly understood by comparing FIG. 18 and FIG. 20, the items TP of the experiences shared by the user A and the user B are CD titles 201 through 204 and hence the number of shared experience items M is equal to 4. On the other hand, the experience items of the remarkable member or the user A are CD titles 201 through 207 and hence the total number of experience items of the remarkable member is equal to 7. Thus, the experience sharing ratio P1 will be equal to 4/7.

Then, in Step S202, the CPU 21 determines if the experience sharing ratio P1 calculated in Step S201 is grater than a predetermined threshold value or not. If the experience sharing ratio P1 is greater than the threshold value, the CPU 21 proceeds to Step S203.

In Step S203, the CPU 21 calculates the sympathy similarity level P2 between the remarkable member and the comparable member by using formula (2) below. The sympathy similarity level P2 is an index indicating the extent of agreement between the sympathy level KAi rated by the remarkable member for the shared experience items TP and the sympathy level KBi rated by the comparable member for the shared experience items TP so that it will have a large value when the two members show similar sympathy levels respectively.

$$P2 = 1 - \sum_{i=1}^{M} ei/M \tag{2}$$

The denominator M of the second term of formula (2) above represents the number of shared experience items, which is equal to 4 in the above example. The numerator of the second term of formula (2) above represents the sum of sympathy differences ei between the remarkable member and the comparable member for the respective shared experience items TP and calculated by means of formula (3) below.

$$ei = |KAi - KBi| \times WA(KAi) \times WB(KBi) \tag{3}$$

KAi and KBi (to be collectively referred to as Ki so long as they do not require any discrimination) represent respectively the sympathy level of the remarkable member and that of the comparable member for a shared experience item TP. Thus, the difference between the sympathy level KAi of the remarkable member and the sympathy level KBi of the comparable member for the shared experience item TP is determined by the first factor of |KAi−Kbi| on the right side of formula (3).

The second factor, or WA(KAi), and the third factor, or WA(KBi), on the right side of formula (3) (to be collectively referred to as W(Ki) so long as they do not require any discrimination) represent respectively the weighting functions to be used for the ambiguity of the sympathy level Ki of the remarkable member and the comparable member for the shared experience item TP, which can be calculated by means of formula (4) below:

$$W(Ki) = 4\alpha(Ki - 0.5)2 + (1 - \alpha) \tag{4}$$

where $0 \leq \alpha \leq 1$.

If the sympathy level is equal to 1.0 or 0.0, the maximum value that W(Ki) can take is equal to 1.0. If, on the other hand, the sympathy level is equal to 0.5, the minimum value that can W(Ki) can take is equal to $(1-\alpha)$.

If a value of 0.5 is given to the sympathy level Ki, it will represent an ambiguous evaluation because it is just at the middle of the best sympathy and the worst sympathy. Therefore, it is so arranged that the value of W(Ki) decreases to reduce the sympathy difference ei as the sympathy level Ki approaches 0.5 or as the evaluation is increasingly ambiguous in order to minimize the ambiguity of evaluation that can be contained in the ultimately determined sympathy similarity level P2.

It should be noted that different values may be selected for a in the weighting function WA(KAi) for the remarkable member and the weighting function WB(KBi) for the comparable member or the weight to be used for the ambiguity of evaluation may be determined by using different weighting functions for the two member. Alternatively, the sympathy similarity level P2 may be determined without using any weight for the ambiguity of evaluation by selecting the value of 0 for α.

The sympathy difference may be determined by referring to a lookup table as shown in FIG. 22 instead of calculating it by means of formula (3) above. In the illustrated lookup table, the sympathy level KAi is shown horizontally, whereas the sympathy level KBi is shown vertically so that the sympathy difference is found at the crossing of the selected sympathy level KAi and the selected sympathy level KBi. For example, if the selected sympathy level KAi is 0.3 and the selected sympathy level KBi is 0.8, the sympathy difference is found at the crossing thereof and equal to 0.4 in the lookup table.

Now, returning to FIG. 21, the CPU 21 determines in Step S204 if the sympathy similarity level P2 calculated in Step S203 is greater than the predetermined threshold value or not. If the calculated sympathy similarity level P2 is greater than the predetermined threshold level, the CPU 21 proceeds to Step S205, where it defines the sympathy similarity level P2 as the taste sharing level F. Note that, if the experience sharing ratio P1 determined in Step S201 and the internally divided value of the sympathy similarity level P2 calculated in Step S203 are used for the taste sharing level F, the taste sharing level F may be obtained by adjusting the sympathy similarity level P2 by means of the experience sharing ratio P1.

If it is determined in Step S202 that the experience sharing ration P1 calculated in Step S201 is smaller than the predetermined threshold value or if it is determined in Step S204 that the sympathy similarity level P2 calculated in Step S203 is smaller than the predetermined threshold value, the CPU 21 proceeds to Step S206, where it selects 0 for the taste sharing level. Then, the taste of the comparable member and that of the remarkable do not have any similarity.

Figure 17:
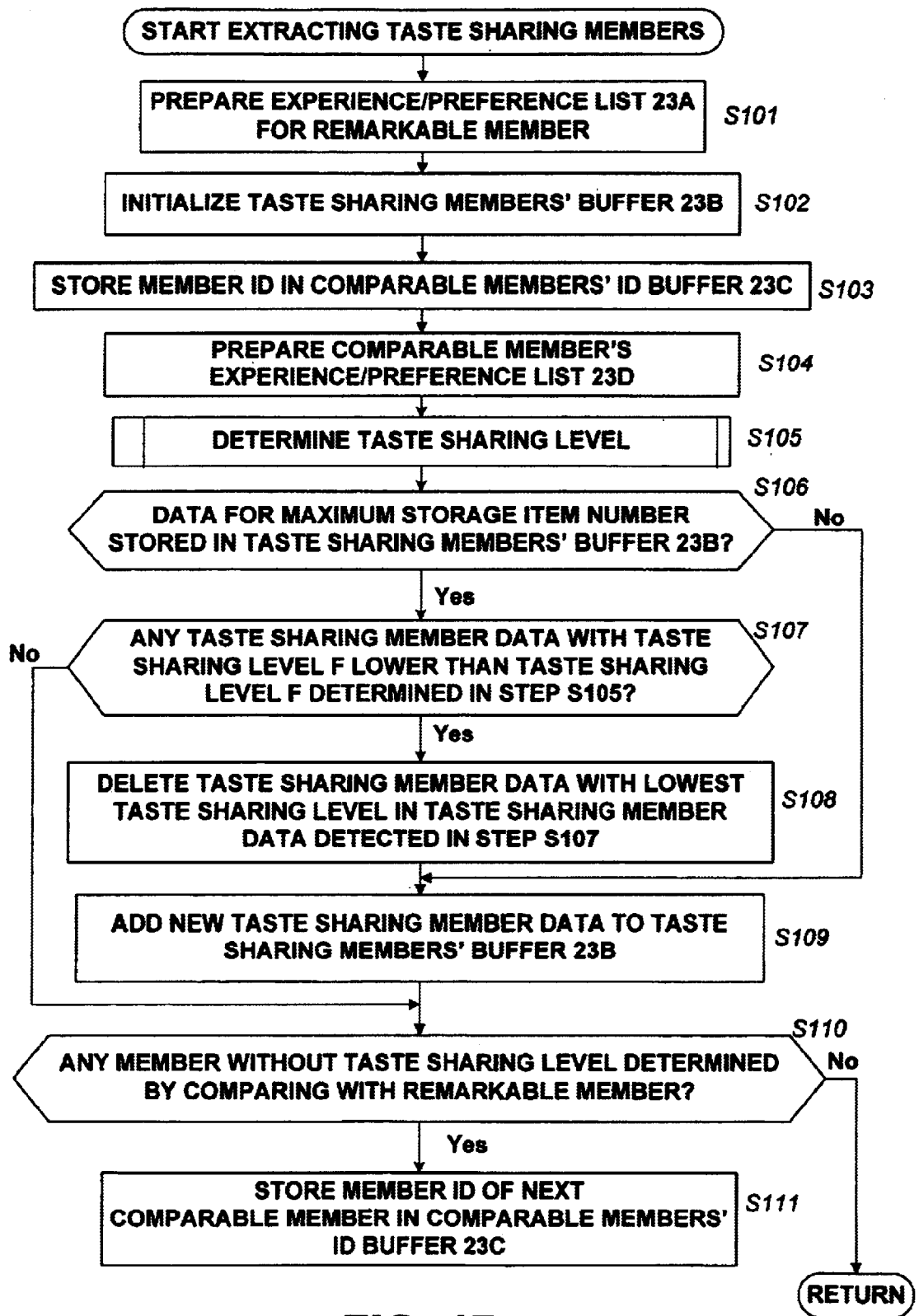
FIG. 17 is a flow chart of the operation of extracting sympathizers for the operation of preparing a recommended CD list of FIG. 16, illustrating the operation procedure in detail.
Figure 21:
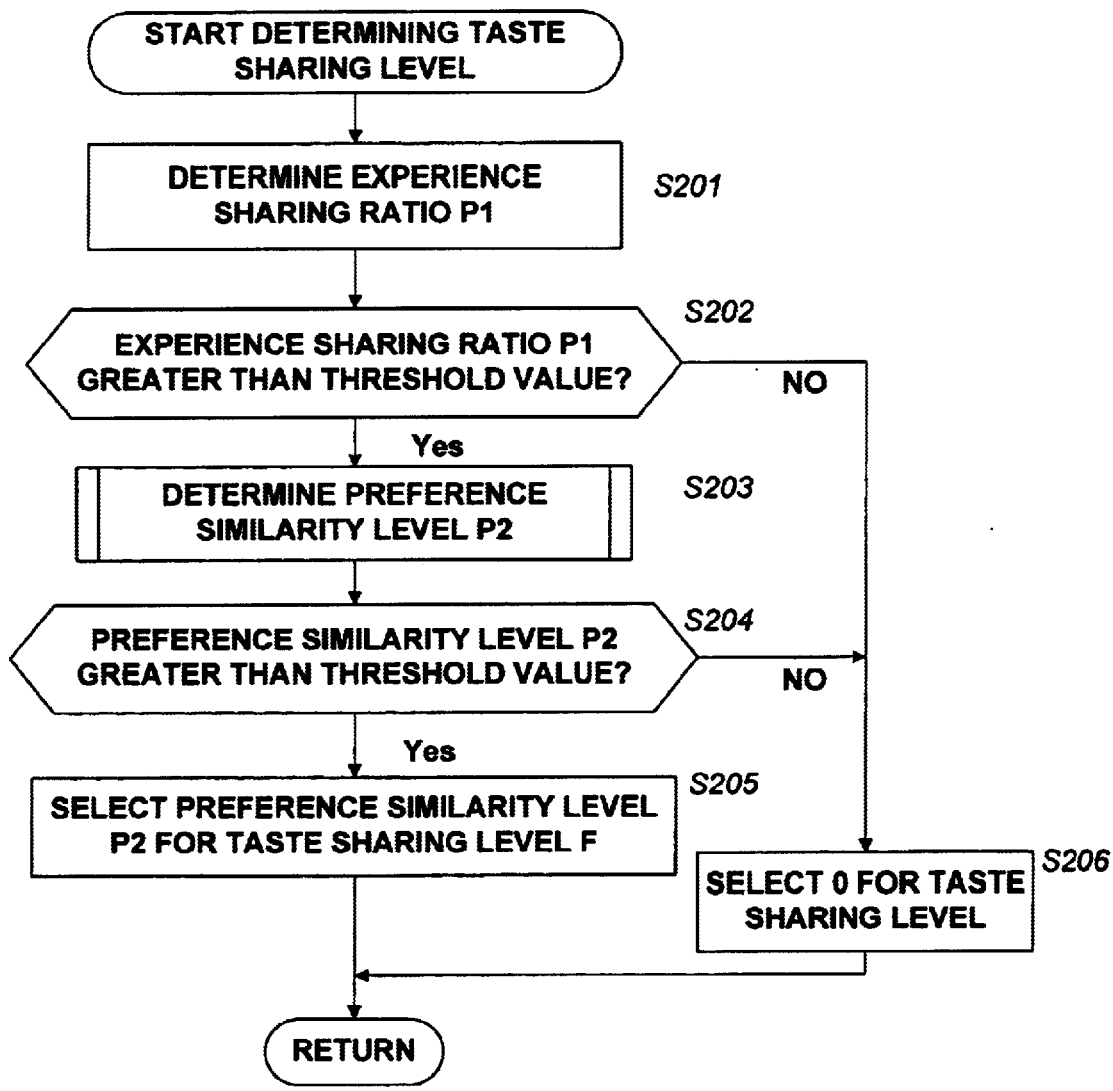
FIG. 21 is a flow chart of the operation of calculating the taste sharing level for the operation of extracting sympathizers, illustrating the operation procedure in detail.

When the operation of calculating the taste sharing level F as illustrated in FIG. 21 is over, the processing operation proceeds to Step S106 in FIG. 17.

While the experience sharing ratio P1 is calculated by means of formula (1) above, the experience sharing ratio P1 may alternatively be calculated by using formula (5) below for the number M of the shared experience items and the number Nmab of the experience items experienced by at least either the remarkable member or the comparable member.

$$P1 = M/Nmab \quad (5)$$

In the case of the above example, the total number of the experience items experienced by the remarkable member (user A) is 7 (FIG. 18) and the total number of the experience items experienced by the comparable member (user B) is 9 (FIG. 20), of which four experience items (CD titles 201 through 204) are shared by the two members. Therefore, the total number Nmb of the experience items experienced by at least either the remarkable member or the comparable member is equal to 12 (=7+9−4). Then, the experience sharing ratio P1 will be equal to 4/12. Therefore, the experience sharing ratio P1 determined by using formula (5) changes as a function of the total number of the experience items experienced by the comparable member.

While the sympathy similarity level P2 is determined by means of formula (2) above, it may alternatively be determined by means of formula (6) below.

$$P2 = 1 - \sum_{i=1}^{M} (KAi - KBi)^2 \bigg/ \left\{ M + \sum_{i=1}^{M} (KAi - KBi - 1)^2 \right\} \quad (6)$$

In the second factor of equation (6), the value of the numerator of formula (7) decreases as the sympathy level KAi rated by the remarkable member for the shared experience item TP and the sympathy level KBi rated by the comparable member for the shared experience item TP come close to each other.

$$\sum_{i=1}^{M} (KAi - KBi)^2 \quad (7)$$

On the other hand, of the denominator of the second factor of formula (6) above, the value of the second term expressed by formula (8) below increases as the sympathy levels KAi and KBi rated by the two members come close to each other and also to 1.0 or 0.0.

$$\sum_{i=1}^{M} (KAi - KBi - 1)^2 \quad (8)$$

Thus, the sympathy similarity level P2 calculated by means of formula (6) is weighted to show a large value when both the sympathy level KAi and the sympathy level Kbi are close to 0.0 or 1.0 and hence the both members give clear (and not ambiguous) evaluations in a same direction.

Alternatively, the sympathy similarity level P2 may be calculated by utilizing covariance. With this method, the sympathy similarity level P2 is determined from a proper value corresponding to a positive correlation (a proper vector in the first or third quadrant) and a proper value corresponding to a negative correlation (a proper vector in the second or fourth quadrant). Firstly, a covariance coefficient matrix is obtained from the sum of the square sum and the product of the average of the two sympathy levels and the two sympathy levels and two proper values and a proper vector (principal direction) corresponding to the proper values are determined by diagonalizing the matrix. For example, the sympathy similarity level P2 may be obtained by calculating the ratio of the obtained two proper values and subtracting it from 1.

Returning back to FIG. 17, the CPU 21 determines in Step S106 if the sympathizers' buffer 23B in the RAM 23 stores sympathizer data for the maximum storage item number Nf max (which is equal to L in the examples of FIGS. 19, 23 and 24) or not. If it is determined that the sympathizers' buffer 23B stores sympathizer data for the maximum structure item number Nf max, the CPU 21 proceeds to Step S107, where it determines if the sympathizers' buffer 23B stores sympathizer data with a taste sharing level F lower than the taste sharing level F calculated in Step S105 or not. If it is found that the sympathizers' buffer 23B stores such sympathizer data, the CPU 21 proceeds to Step S108.

In Step S108, the CPU 21 deletes the sympathizer data with the lowest taste sharing level F from the sympathizer data with taste sharing levels F lower than the taste sharing level F calculated in Step S105 and determined in Step S107. More specifically, in the sympathizers' buffer 23B, the sympathizer data are listed with the taste sharing levels F in the descending order as shown in FIG. 23 (the numbers allocated to the sympathizer data being listed in the ascending order). Therefore, the sympathizer data with the largest number (number L in FIG. 23) will be deleted from the sympathizers' buffer 23B. Note that the maximum structure item number Nf max can be modified within the memory capacity of the hard disk 27.

Then, in Step S109, new sympathizer data is added to the sympathizers' buffer 23B. More specifically, the CPU 21 stores the sympathizer data including the taste sharing level F calculated in Step S105 and arrange all the sympathizer data stored in the buffer in such a way that the taste sharing levels F of the data are arranged in the descending order while the numbers allocated to them are arranged in the ascending order. To be more accurate, the CPU 21 compares the taste sharing level F determined in Step S105 with that of the sympathizer data having the largest number stored in the sympathizers' buffer and if the former is higher, it compares the former with the taste sharing level F of the sympathizer data having the next largest number and so on. If it is eventually found that the taste sharing level F determined in Step S105 is equal to lower than that of one of the sympathizer data stored in the sympathizers' buffer 23B, the new sympathizer data is stored with the number greater than the number of the latter by 1.

Then, in Step S110, the CPU 21 determines if there are data for one or more than one members whose taste sharing level F has not been calculated for the remarkable member (who has not been selected as comparable member) or not. If data for such members exist, the CPU 21 proceeds to Step S111, where it selects the member ID of the next comparable member from the member IDs of those who are not comparable members and stores it in the comparable members' ID buffer 23C in the RAM 23. Thereafter, the CPU 21 returns to Step S104 and repeats the above processing operation if appropriate.

If the CPU 21 determines in Step S106 that the sympathizers' buffer 23B does not store sympathizer data for the maximum storage item number Nf max (and the number of items of the sympathizers' data stored in the sympathizers' buffer 23B is smaller than L), it proceeds to Step S109, where it stores the new sympathizer data with the taste sharing level F calculated in Step S105 so that all the sympathizer data stored in the buffer are arranged in such a way that the taste sharing levels F of the data are arranged in the descending order while the numbers allocated to them are arranged in the ascending order.

If it is determined in Step S107 that there is no taste sharing level F smaller than the taste sharing level F calculated in Step S105, the CPU 21 skips Steps S108 and S109 (and hence does not add the sympathizer data to the sympathizers' buffer 23B) and proceeds to Step S110, where it determines if there are data for one or more than one members whose taste sharing level F has not been calculated for the remarkable member or not.

If it is determined in Step S110 that there is no member whose taste sharing level F has not been calculated yet for the remarkable member, the processing operation will be terminated.

In this way, sympathizers having a taste similar to that of the remarkable member (user A) are selected and their data are stored in the sympathizers' buffer 23B.

It is possible in Step S104 to select data meeting certain requirements from the experience/sympathy element data E stored in the personal experience/sympathy records R of the comparable members and put them on the comparable members' experience/sympathy list 23D. For instance, only the experience/sympathy element data E contributed within the last one month may be put on the comparable members' experience/sympathy list 23D. Then, sympathizers may be selected on the basis of relatively new experience/sympathy element data E. In this case, any members whose experience/sympathy element data E do not meet the requirements will not be selected as comparable members. The requirements to be met when selecting experience/sympathy element data may include the date and spot of experience and complex requirements may be used by combining more than one requirements.

The requirements to be met for selecting sympathizers may further include the sex, the age, the region of the residence, the membership of one or more than one specific organizations and the possession of an electronic mail address that can be used for personal communications in addition to the above described taste sharing level F. Then, the CPU 21 determines each new comparable member on the basis of the provided requirements for extracting sympathizers in Step S103. It may be possible to use a compound value obtained from a logical value determined for each simple requirement proposition by means of a logical formula corresponding to a composite requirement proposition as criterion for selecting a comparable member out of a number of candidates who are ordinary members. Then, members who do not satisfy the requirements for selecting sympathizers will not be selected as sympathizers because comparable members are selected on the basis of the criterion.

Since the remarkable member's experience/sympathy list 23A is referred to repeatedly in the above processing operation, the operation may be made to proceed at high speed if the remarkable member's experience/sympathy list 23A is stored in a contents addressable memory having a configuration as shown in FIG. 18 (and having a column for experience items and a column for sympathy levels). For instance, of the data stored in the remarkable member's experience/sympathy list 23A, those arranged in the column of experience items may be made to be fixed length data and the latter may be used as address data on the contents addressable memory. Then, the sympathy levels corresponding to them may be stored in the contents addressable memory as associated data.

For instance, both the comparable members' experience/sympathy list 23D and the remarkable member's experience/sympathy list 23A will have to be referred to for the calculation of experience sharing ratio P1 in Step S201 when the latter is stored in the RAM 23. Then, in the case of the above example, the step of comparing the experience of the remarkable member and that of a comparable member will involve a total of 63 comparisons which is the product of the number of items of the remarkable member's experience/sympathy list 23A, which is 7, and that of the comparable member's experience/sympathy list 23D, which is 9. To the contrary, when the remarkable member's experience/sympathy list 23A is stored in a contents addressable memory, the number of comparisons will be only 9, which is the number of items of the comparable member's experience/sympathy list 23D.

Now the operation of generating a synthetic experience/sympathy list in Step S74 in FIG. 16 will be discussed in detail by referring to the flow chart of FIG. 25.

Firstly, in Step S301, the CPU 21 initializes the experience/sympathy accumulation buffer 23E (which will be described hereinafter by referring to FIG. 27) in the RAM 23 and then, in Step S302, it initializes the reading j of the counter for counting the number of the sympathizer data stored in the sympathizers' buffer 23D.

Then, in Step S303, the CPU 21 selects the member having the member ID that is contained in the sympathizer data with the number corresponding to the reading j of the counter as synthesis target member and reads out the personal experience/sympathy record R of the member from the hard disk 27, which it then stores in the synthesis target member experience/sympathy list 23F (not shown) in the RAM 23. If j=1, of the sympathizer data stored in the sympathizers' buffer 23B, the sympathizer having the member ID that corresponds to the data at the top (with the smallest number) and hence the highest sympathy level is selected as synthesis target member.

Then, in Step S304, the CPU 21 adds data to the experience/sympathy accumulation buffer 23E on the basis of the experience/sympathy element data E stored in the synthesis target member experience/sympathy list 23F.

Now, the processing operation for adding data to the experience/sympathy accumulation buffer 23E in Step S304 will be described by referring to the flow chart of FIG. 26.

In Step S401, the CPU 21 initializes the reading i of the counter for counting the number Ni of experience items stored in the synthesis target member experience/sympathy list 23F to 1.

Then, in Step S402, the CPU 21 determines if the experience item Ti of the experience/sympathy element data E corresponding to the reading i of the counter exists in the experience tem list of the experience/sympathy accumulation buffer 23E or not. If the experience item Ti exists in the experience/sympathy accumulation buffer 23E, the CPU 21 proceeds to Step S403, where it adds the sympathy level K of the experience/sympathy element data E corresponding to the counter reading i to the sympathy level array 23G (FIG. 27) that corresponds to the experience item Ti (CD title).

If the CPU determines in Step S402 that the experience item Ti (stored in the synthesis target member experience/sympathy list 23F) does not exist in the experience/sympathy accumulation buffer 23E, it puts the experience item Ti of the experience/sympathy element data E to the bottom of the experience item list of the experience/sympathy accumulation buffer 23E in Step S404 and assigns the sympathy level K corresponding to the experience item Ti to the sympathy level array 23G that also corresponds to the experience item Ti in Step S405.

If the sympathy level K is assigned in the sympathy level array 23G in Step S403 or S405, the CPU 21 proceeds to Step S406, where it determines if the counter reading i is equal to the experience item number N of the synthesis target member experience/sympathy list 23F or not. If they are not equal to each other, the CPU 21 proceeds to Step S407, where it increments the counter reading i by 1 and returns to Step S402 to follow the subsequent steps.

Figure 25:
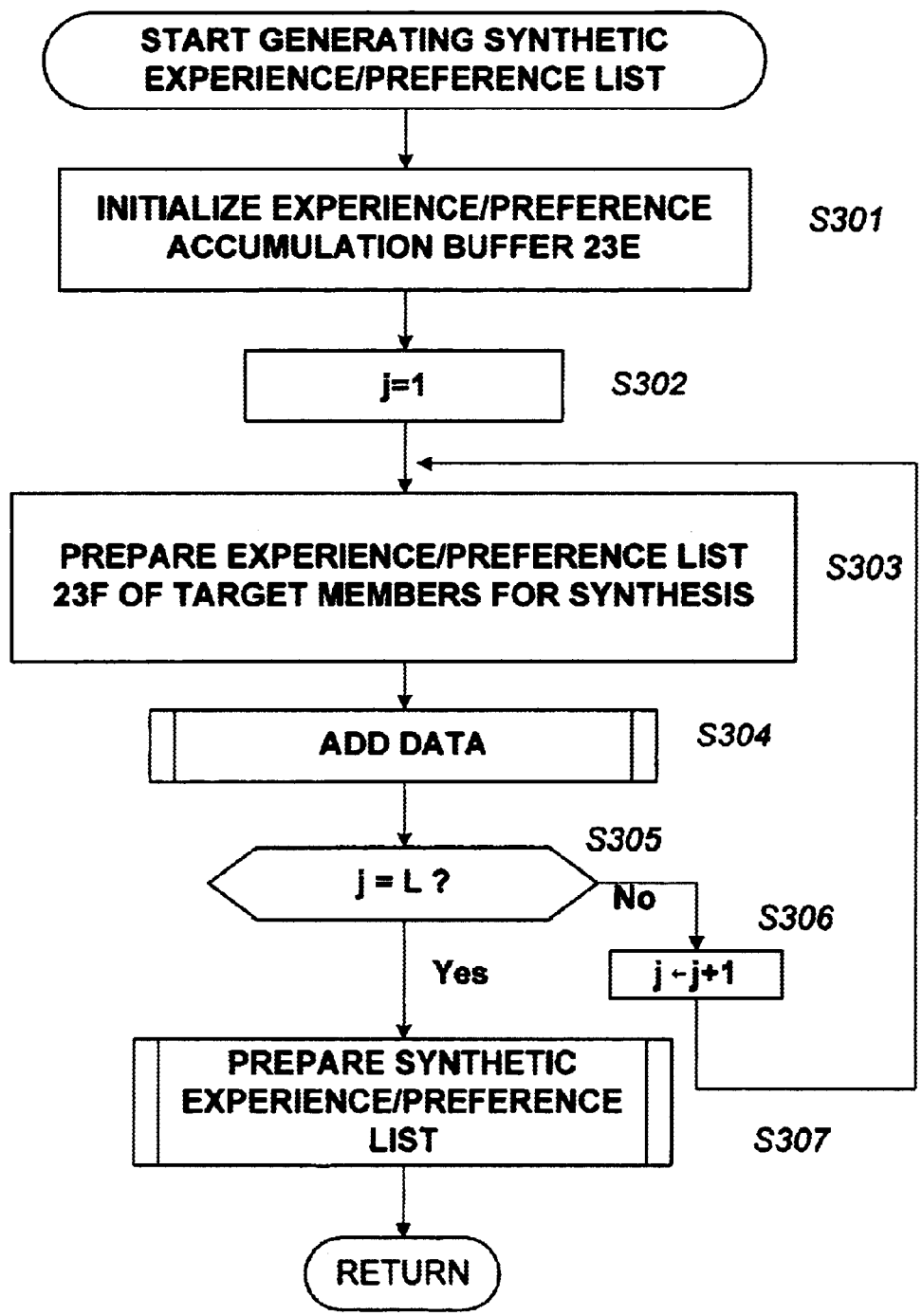
FIG. 25 is a flow chart of the operation of preparing a synthetic experience/sympathy list for the operation of preparing a recommended CD list of FIG. 16, illustrating the operation procedure in detail.
Figure 26:
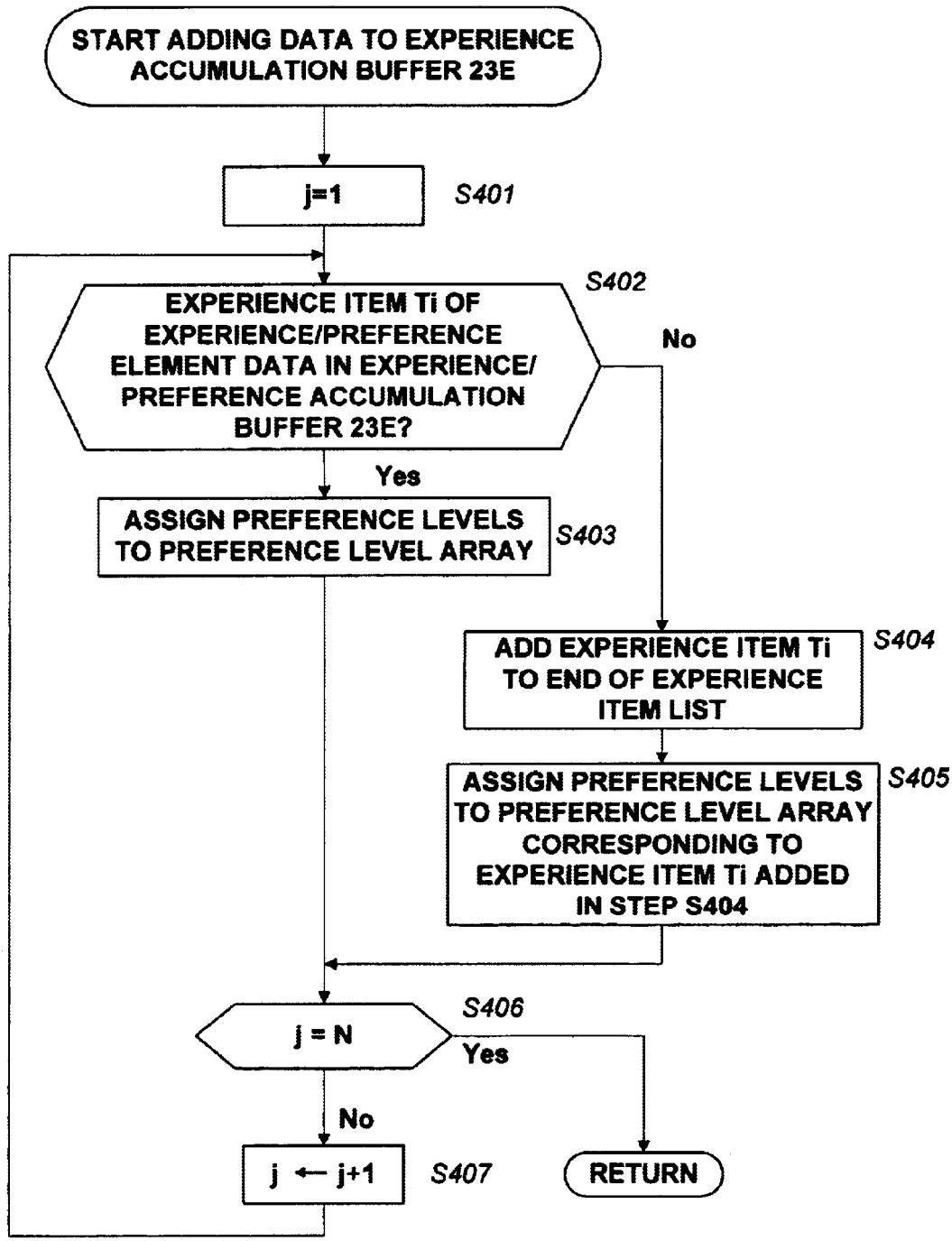
FIG. 26 is a flow chart of the operation of adding data for the operation of preparing a synthetic experience/sympathy list of FIG. 25, illustrating the operation procedure in detail.

If it is determined by the CPU 21 in Step S406 that the counter reading i is equal to the experience item number N of the synthesis target member experience/sympathy list 23F, the CPU 21 terminates the operation of the flow chart in FIG. 26 and resumes the Step S305 in FIG. 25.

In Step S305, the CPU 21 determines if the reading of the counter for counting the number of the sympathizer data stored in the sympathizers' buffer 23B is equal to the last number L of the sympathizers' buffer 23B or not. If it is determined that the counter reading j is not equal to the last number L, the CPU 21 proceeds to Step S306, where it increments the counter reading j by 1 and returns to Step S303 and repeats the following steps.

Figure 27:
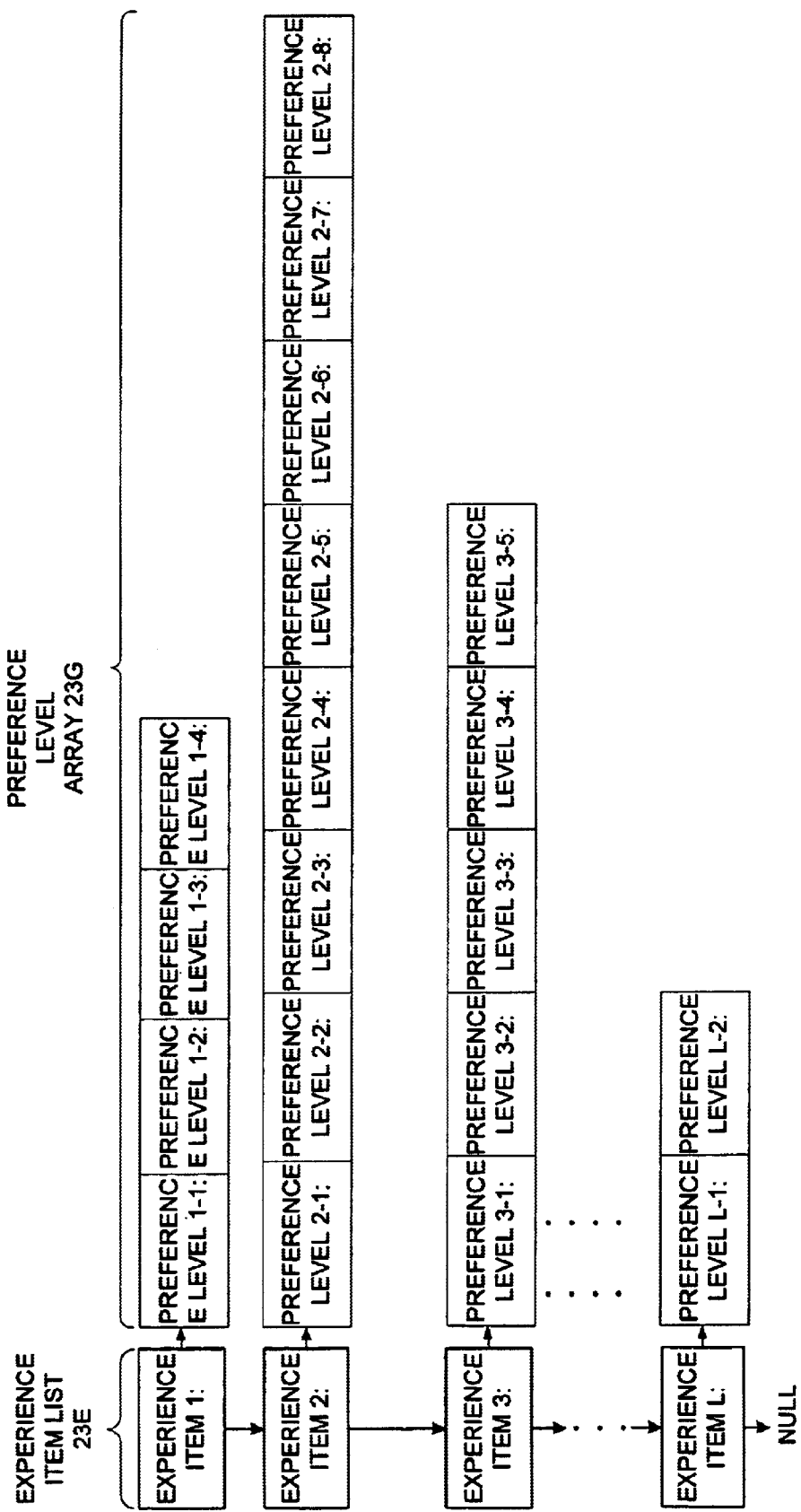
FIG. 27 is an example of experience/sympathy accumulation buffer.

In this way, the experience/sympathy accumulation bf 23E stores experience items T and the sympathy levels are assigned to the corresponding sympathy level array 23G as shown in FIG. 27.

If it is determined in Step S305 that the counter readingj is equal to the number L of the sympathizer data stored in the sympathizers' buffer 23B, the CPU 21 proceeds to Step S307.

Figure 28:
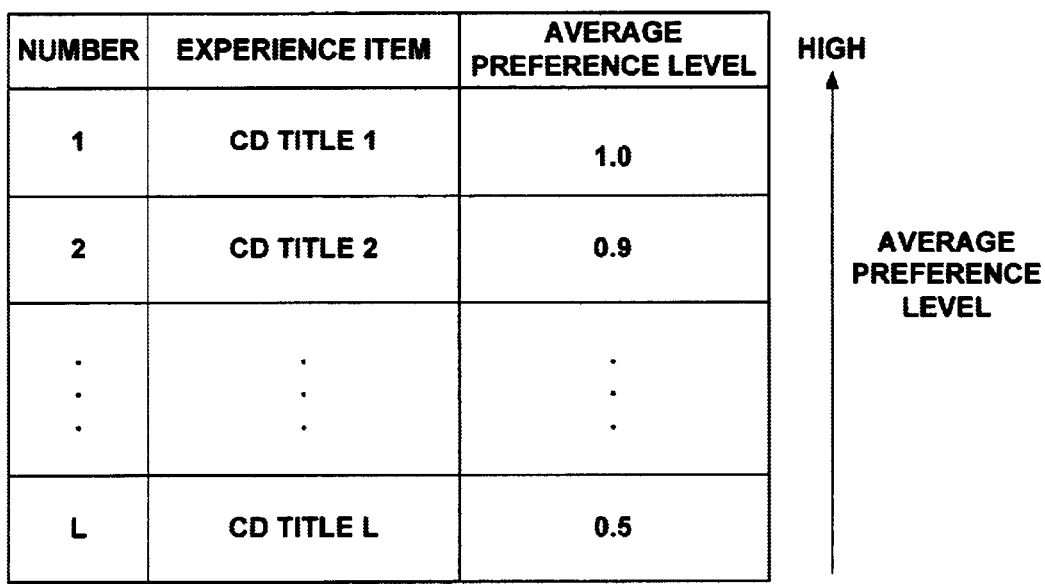
FIG. 28 is an example of synthetic experience/sympathy list.

In Step S307, the CPU 21 executes the operation of preparing a synthetic experience/sympathy list. More specifically, the CPU 21 calculates the average of the sympathy levels K assigned to the corresponding sympathy level array 23G for each of the experience items T put into the experience item list in the experience/sympathy accumulation buffer 23D. In the case of the example of FIG. 27, the average of the sympathy level 1-1 through sympathy level 1-4 is calculated for the experience item Ti and then the average of the sympathy level 2-1 through sympathy level 2-8 is calculated for the experience item T2. Subsequently, the CPU 21 rearrange the experience items T in the descending order of the calculated average values of the sympathy levels K to prepare a synthetic experience/sympathy list 23H as shown in FIG. 28. The processing operation of Step S307 will be discussed hereinafter by referring to the flow chart of FIG. 29.

When the synthetic experience/sympathy list 23H is prepared, the processing operation of FIG. 25 is terminated.

Figure 29:
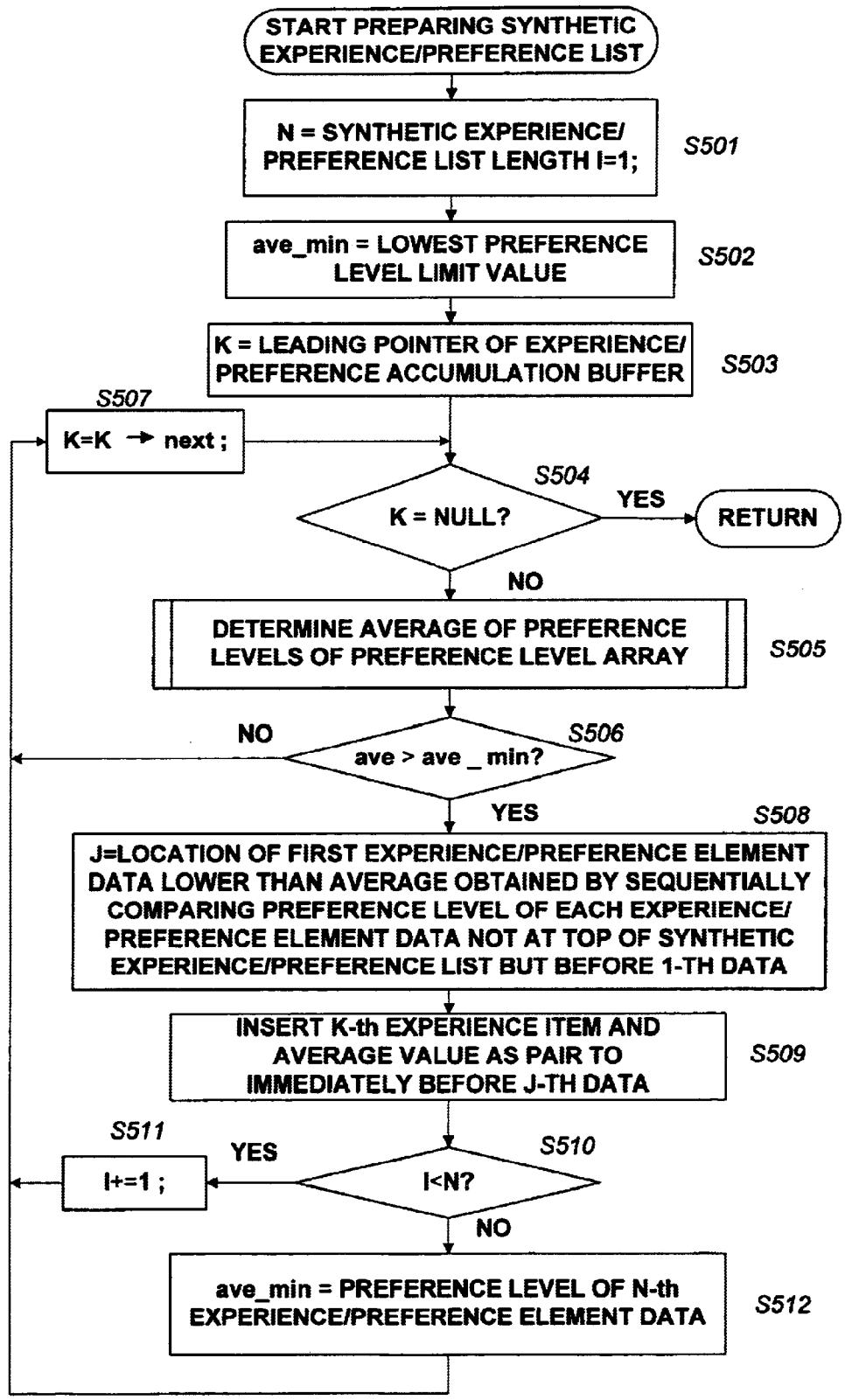
FIG. 29 is a flow chart of the operation of preparing a synthetic experience/sympathy list, illustrating the operation procedure in detail.

Now, the processing operation for preparing a synthetic experience/sympathy list in Step S307 of FIG. 25 will be discussed in detail by referring to the flow chart of FIG. 29. Referring to FIG. 29, in Step S501, the CPU 21 selects the length of the synthetic experience/sympathy list 23H for variable N and then selects 1 for variable I representing the length of the substituted portion of the list. Then, in Step S502, the CPU selects the minimum sympathy level limit value for av_min. If there does not exist any particular lowest sympathy level limit value, the CPU 21 selects the leading pointer of the experience/sympathy accumulation buffer 23E (FIG. 27) for variable K in Step S503.

Figure 30:
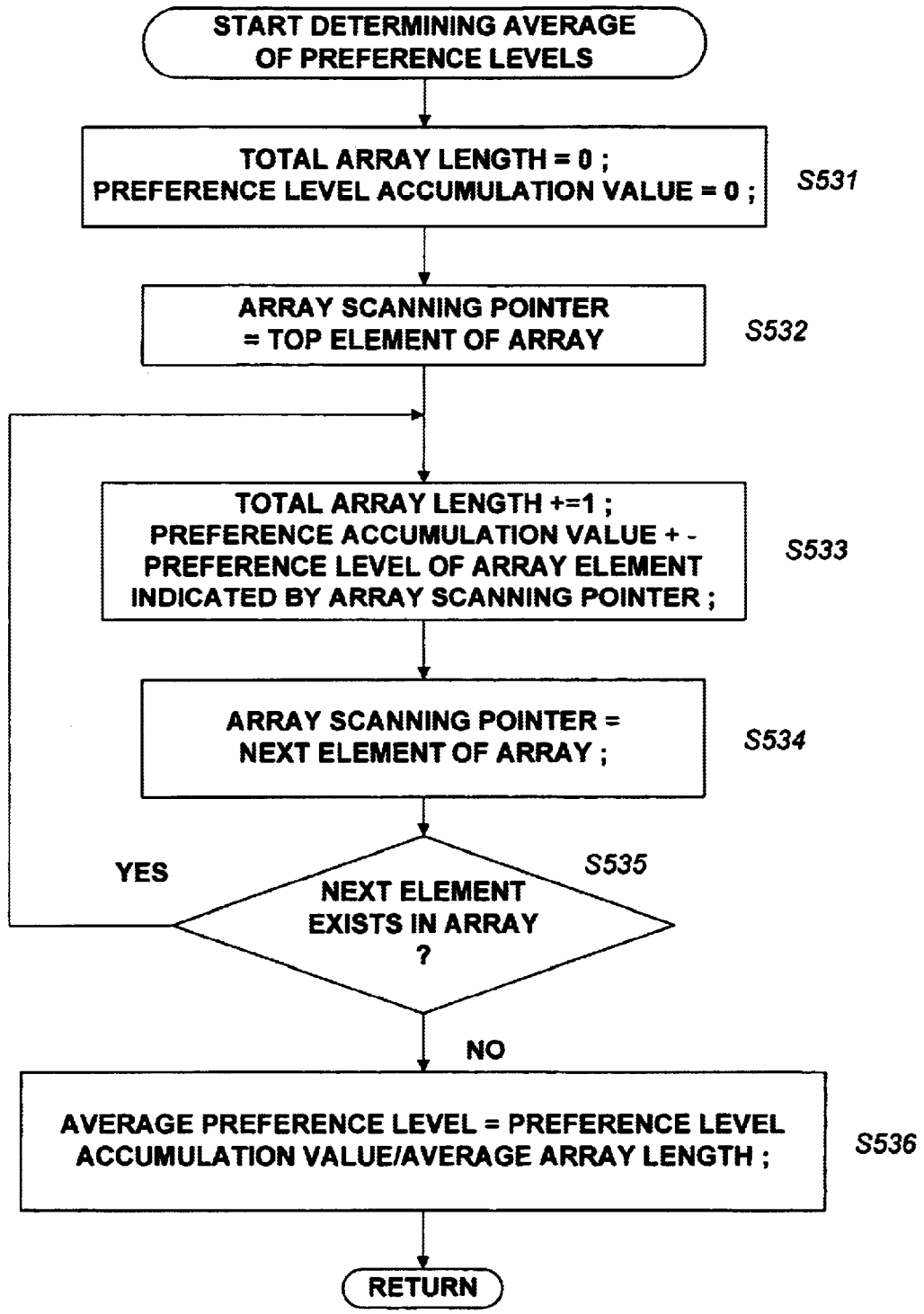
FIG. 30 is a flow chart of the operation of calculating the average value of sympathy levels for the operation of preparing a synthetic experience/sympathy list of FIG. 29, illustrating the operation procedure in detail.

Then, in Step S504, the CPU 21 determines if variable K is equal to null or not. If variable K is not equal to null, the CPU 21 proceeds to Step S505, where it calculates the average of the sympathy levels of the sympathy level array 23G annexed to the experience item represented by variable K. The processing operation of this step is illustrated in the flow chart of FIG. 30.

More specifically, in Step S531, the CPU 21 selects 0 for the total array length and the accumulated sympathy levels. Then, in Step S532, the CPU 21 select the top element of the array for the array scanning pointer. Thus, in the example of FIG. 27, the sympathy level 1-1 will be selected for the value of the array scanning pointer.

Then, in Step S533, the CPU 21 adds 1 to the total array length and also adds the value of the sympathy level of the array element pointed by the array scanning pointer to the accumulated sympathy levels. In the above example, the value of the sympathy level 1-1 will be added to the value of the accumulated sympathy level. Then, in Step S534, the CPU 21 selects the next element of the array for the array scanning pointer. In the above example, the sympathy level 1-2 will be selected for the array scanning pointer.

Then, in Step S535, the CPU 21 determines if there still remains the next element in the array or not. Since the answer to this question is positive in the above example, the CPU 21 returns to Step S533, where it once again adds I to the total array length and also adds the value of the sympathy level of the array element pointed by the array scanning pointer to the accumulated sympathy levels (the value of sympathy level 1-2 in the above example). Then, in Step S534, the CPU 21 selects the next element of the array for the array scanning pointer. In the above example, the sympathy level 1-3 will be selected for the array scanning pointer. Once again, in Step S535, the CPU 21 determines if there still remains the next element in the array or not and repeats the subsequent steps.

In this way the above steps are repeated until it is determined in Step S535 that there remains no next element in the array.

In the case of the above example, after adding the values of the sympathy level 1-1 through the sympathy level 1-4, the CPU 21 determines in Step S535 that there remains no next element in the array and hence proceeds to Step S536, where it calculates the average sympathy level by means of the formula (9) below.

$$\text{average sympathy level} = \text{accumulated value of sympathy levels} / \text{total array length} \qquad (9)$$

Thus, in the case of the above example, the average sympathy level is obtained by dividing the accumulated sum of the sympathy level 1-1 through sympathy level 1-4 by the average array length, which is equal to 4. Then, the obtained average sympathy level is selected for the variable ave.

As the average sympathy level ave is obtained by the above calculation, the CPU 21 proceeds to Step S506, where it determines if the average sympathy level ave obtained in Step S505 is greater than the minimum sympathy level limit value av_min or not selected in Step S502 or not. If it is found in Step S505 that the average sympathy level ave is equal to or smaller than the minimum sympathy level limit value av_min, it is not meaningless to process the experience item and therefore the CPU 21 proceeds to Step S507, where it selects the next pointer value for variable K. Then, the CPU 21 proceeds to Step S504 and repeats the above steps once again.

If it is determined in Step S506 that the average sympathy level ave calculated in Step S505 is greater than the minimum sympathy level limit value av_min, the processing operation for registering the experience item to the synthetic experience/sympathy list 23H. More specifically, in Step S508, the CPU 21 compares sequentially the sympathy levels of the experience/sympathy element data E after the top of the synthetic experience/sympathy list 23H but before the I-th item with the average sympathy level ave (that is the CPU 21 compares sequentially the average sympathy levels already registered to the synthetic experience/sympathy list 23H with the average sympathy level ave obtained in Step S536) and selects the position of the first experience/sympathy element data E that goes under the average sympathy level ave for variable J. Then, in Step S509, the CPU 21 combines the K-th experience item and its average sympathy level as pair and inserts them into the synthetic experience/sympathy list 23H. For instance, the CPU 21 may shift each of the experience/sympathy element data from the I-th (N–1-th if I is equal to N) experience item at the bottom and the J-th experience item at the top backwardly by 1 (toward the lower sympathy level) and combines the K-th experience item and its average sympathy level ave as pair, which are then inserted into the synthetic experience/sympathy list 23H (as experience/sympathy element data).

Then, the CPU 21 proceeds to Step S510, where it determines if the list length I of the substituted portion of the synthetic experience/sympathy list 23H is greater than the entire list length N or not. If the answer to this question is yes, the CPU 21 proceeds to Step S511, where it selects the value of the next pointer to variable K, and then moves to Step S511, where it increments variable I by 1. Thereafter, the CPU 21 moves to Step S507, where it selects the value of the next point for variable K, and then returns to Step S504 to repeat the above steps. In the case of the above example, the processing steps described above for the experience item 1 will be followed all the way for the second experience item in FIG. 27.

In this way, when it is found in Step S510 that the list length I of the substituted portion of the synthetic experience/sympathy list 23H is equal to the entire list length N, the CPU 21 proceeds to Step S512, where it selects the sympathy level of the N-th experience/sympathy element data for av_min. Thus, any experience/sympathy element data having a sympathy level equal to or lower than the sympathy level of the N-th experience/sympathy element data will not be registered to the synthetic experience/sympathy list. The, the CPU 21 returns to Step S507, where it selects the value of the next pointer for variable K and repeats the steps from Step S504 until it variable K is found to be equal to NULL in Step S504. When it is determined in Step S504 that variable K is equal to NULL, the operation of preparing a synthetic experience/sympathy list in Step S307 of FIG. 25 is completed (and the CPU 21 proceeds to Step S75 in FIG. 16).

Now, a synthetic experience/sympathy list 23H (FIG. 27) is generated.

Note that, in Step S303, the experience/sympathy element data E stored in the personal experience/sympathy record R of a synthesis target member can selectively used for the personal experience/sympathy list 23F of the synthesis target member using various requirements. For example, only the experience/sympathy element data E contributed within the last one month may be used for the personal experience/sympathy list 23F of the synthesis target member. With such an arrangement, a synthetic experience/sympathy list 23H can be prepared by selectively using experience/sympathy element data that satisfy certain requirements. Then, any members who do not have experience/sympathy element data E that meet the requirements will not be selected as synthesis target members. Requirements that can be used for selecting experience/sympathy element data E may include the date and spot of experience as well as many others and complex requirements may be used by combining more than one requirements.

Now, the operation of preparing a recommended experience (CD) list in Step S75 of FIG. 16 will be described in detail. The CPU 21 of the experience/sympathy information providing server 14 prepares a recommended experience (CD) list 231 as shown in FIGS. 12 through experience/sympathy information providing server 14 on the basis of the synthetic experience/sympathy list 23H prepared in Step S74 and have the communication section 26 to transmit it to the terminal 11.

The contents of the recommended experience list 231 may include those obtained by using the synthetic sympathy levels of the synthetic experience/sympathy list 23H (the average sympathy levels in FIG. 28) for the recommendation levels of the corresponding experience items (CD titles), (in which case, the recommended experience list 231 will appear like the list of FIG. 12 that is similar to the synthetic experience/sympathy list 23H shown in FIG. 28). Alternatively, they may include only CD titles, excluding recommendation levels, (in which case, the recommended experience list 231 will appear like the list of FIG. 14 that can be obtained by eliminating the average sympathy levels from the synthetic experience/sympathy list 23H in FIG. 28).

Additionally, the number of CD titles contained in the recommended experience list 231 may be limited to n, (in which case the recommended experience list 231 includes only the top n (n <L) CD tittles in the synthetic experience/ sympathy list 23H shown in FIG. 28 and may appear like the list of FIG. 4), or the recommended experience list 231 may be made to contain CD titles above a maximum recommendation level, (in which case the average sympathy level will be higher than a predetermined threshold value and the recommended experience list 231 will contain the top m CD title, (m being a number not greater than the number L of the CD titles contained in the synthetic experience/sympathy list 23H and the number of the CD titles whose average sympathy level is above a threshold level) so that it may appear like the one shown in FIG. 13).

Additionally, the characters used for the experience items in the recommended experience list 231 may be made impressive to reflect their respective recommendation levels. Still additionally, if the recommended experience list 231 is not expected to be read by men, the information of the recommended experience list 231 may be output in a binary format.

Figure 16:
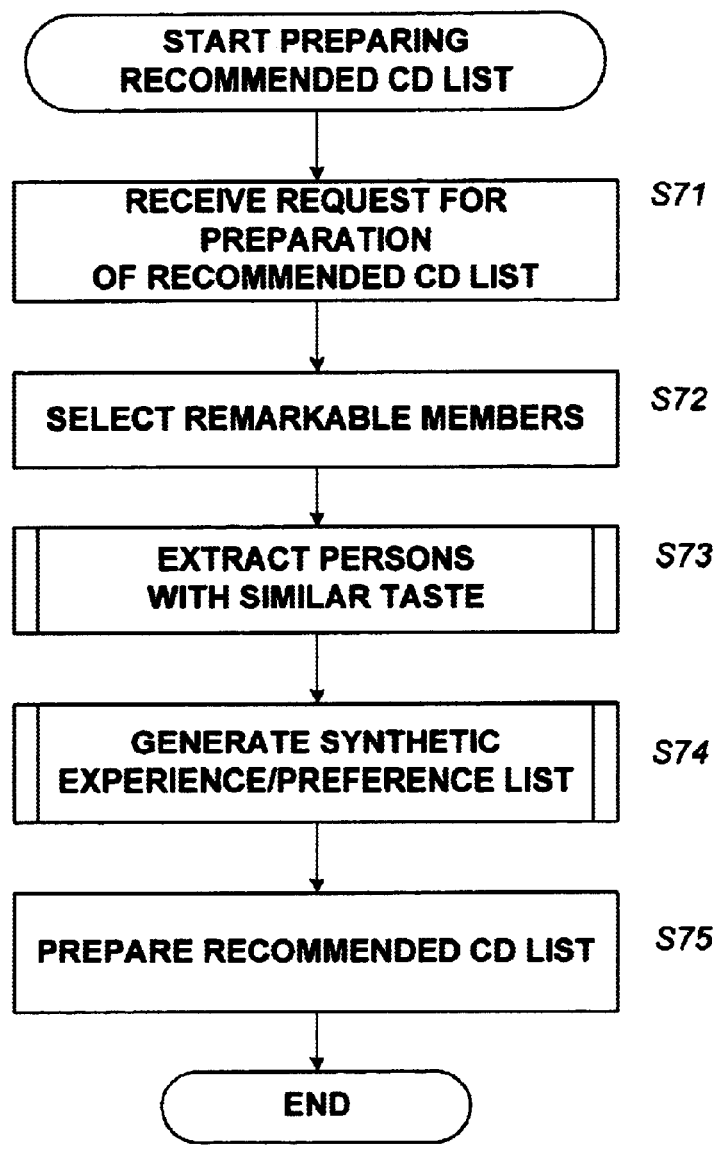
FIG. 16 is a flow chart of the operation of preparing a recommended CD list.

It may also possible to provide services of introducing sympathizers on the basis of the sympathizer list (obtained from the sympathizer buffer 23B in FIG. 23 or 24) obtained as a result of the processing operation down to Step S73 in FIG. 16. For example, mail addresses of sympathizers may be included in the service of introducing sympathizers. Then, however, certain restrictions may have to be arranged for providing private information for the purpose of privacy protection. For instance, for a applied specific experience, it may be so arranged that private information can be provided to a member who requested the information only when the member satisfies certain requirements for sympathizers. In actual situations, restrictions for providing private information from an experience/sympathy information providing server 14 may be such that they are stored corresponding to the mail addresses of the members and private information can be contained in a list for introducing sympathizers only when the restrictions corresponding to the mail addresses are acknowledged and met.

Restrictions for providing private information may additionally include that a sympathizer is authorized only for a the specific experience for which the sympathizer applied and that the sympathizer can write Japanese along with complex requirements obtained by combining more than one requirements. Additionally, the experience/sympathy information providing server 14 may propose restrictions for providing private information and the members may select appropriate ones therefrom. Alternatively, the members may cooperatively draw a draft of restrictions by way of user interfaces.

Now, a process of introduction of associated experiences will be discussed below. This process is characterized in that the category of preparing experience/sympathy lists 23A, 23D to be referred to for selecting sympathizer in Step S73 of FIG. 16 differs from the category of preparing a synthetic experience list in Step S74 of FIG. 16. For instance, if a member who requested a recommended experience list of articles on music does not possess may experience/sympathy element data E relating to experiences in terms of music-related articles, a satisfactory recommended experience list (on music-related articles) may not be prepared by the above described operations. However, if the member who requested a recommended experience list of music-related articles possesses many experience/sympathy element data E relating to CDs, sympathizers may be selected firstly on the basis of the experience/sympathy element data E relating to CDs and a synthetic experience/sympathy list may be prepared on the basis of the experiences of the selected sympathizers relating to music-related articles, (in other words, on the basis of associated experiences). Then, the member may be able to obtain a satisfactory recommended experience list (relating to music-related articles).

Figures 31, 32:
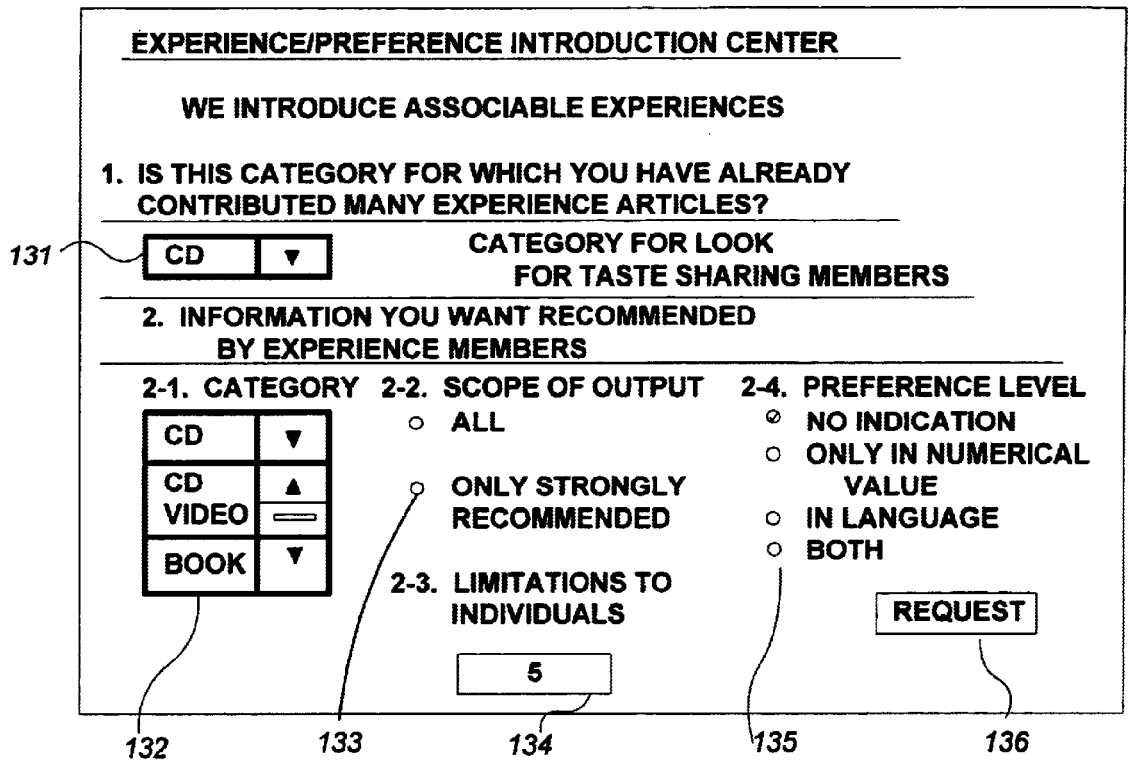
FIG. 31 is still another example of GUI display of the terminal unit of FIG. 3.
FIG. 32 is an illustration of the format of the data out from said terminal unit corresponding to the example of GUI display of FIG. 31.

FIG. 31 shows an example of GUI that can be used for preparing a recommendation on the basis of associated experiences. As shown in FIG. 31, the user is prompted to specify an category in which the user already possesses may experience/sympathy element data E by way of input section 131. Input sections 132 through 135 are used to enter the types of information with which the user wants to receive recommendations. Since the functions of the input sections 132 through 135 are similar to those of the input sections 111 through 114 in FIG. 14, they will not be described here any further.

Referring to FIG. 31, as the user inputs data on the GUI and requests information on associated experiences (by depressing the request button 136), the terminal 11 transmits a request for associated experience data to the experience/sympathy information providing server 14 as shown in FIG. 32. The associated experience data requested by the user correspond to the inputs made by the user by way of the input columns 131 through 135 on the GUI of FIG. 31. The category of sympathy corresponds to the input made by way of the input section 131 of FIG. 31 (which is "CD" in the illustrated example) and the requested recommendation corresponds to the input made by way of the input section 132 of FIG. 31 (which is "book" in the illustrated example). The minimum sympathy limit level av_min corresponds to the input made by way of the input 133. In the illustrated example, the minimum sympathy limit level av_min is 0.5 because "only strongly recommended" is specified by the user.

Figure 33:
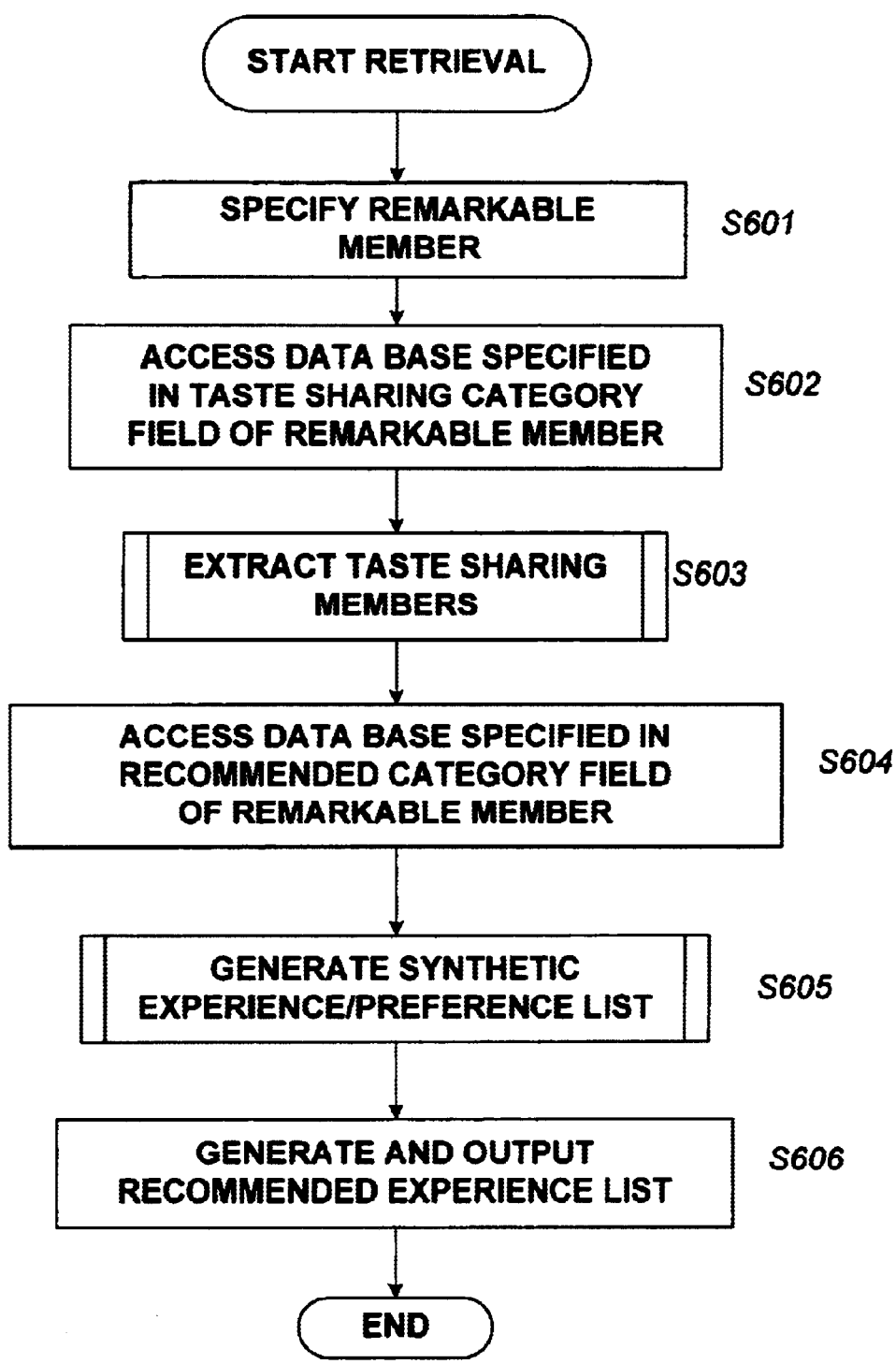
FIG. 33 is a flow chart of the operation of the experience/sympathy information providing server of FIG. 2.
Figure 34:
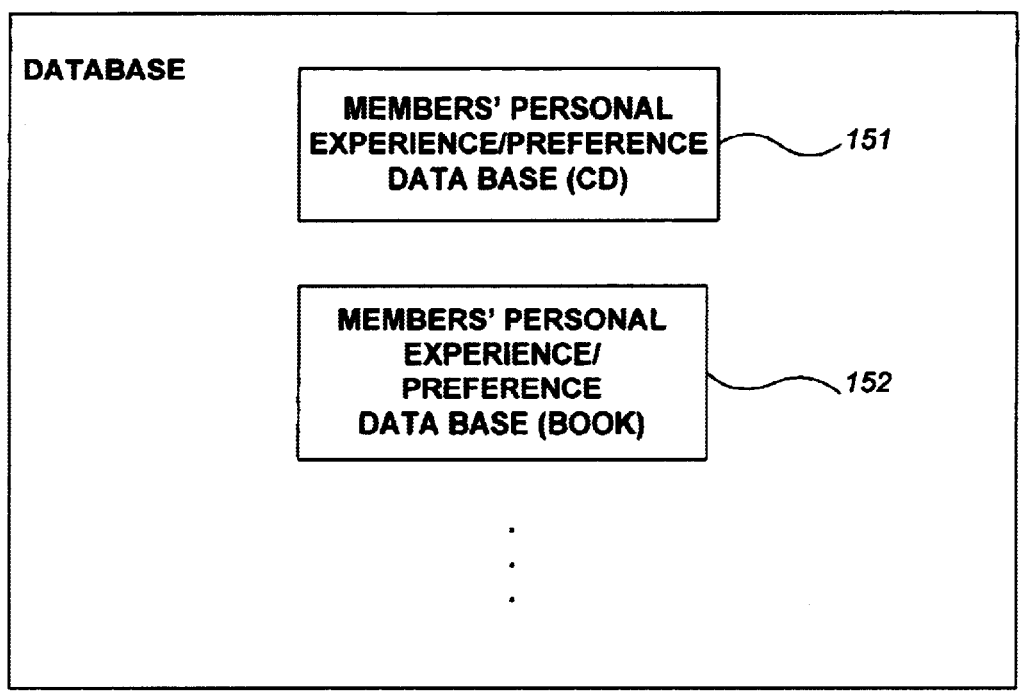
FIG. 34 is an example of data base.

Upon receiving a request for associated experience data as shown in FIG. 32 from the terminal 11, the CPU 21 of the experience/sympathy information providing server 14 executes a processing operation as shown in the flow chart of FIG. 33. Firstly, in Step S601, the CPU 21 specifies the member of the terminal 11 requesting information for associated experiences as remarkable member. Then, in Step S602, the CPU 21 accesses the data base for the category of taste specified by the remarkable member specified in Step S602. Since CD is specified for the category of taste in the case of the example of FIG. 32, the CPU 21 accesses the personal experience/sympathy data base 151 of the member relating to CDs in the data base of the hard disk 27 as shown in FIG. 34.

Then, in Step S603, the CPU 21 executes a processing operation for extracting sympathizers by using the data base accessed in Step S602. This processing operation for selecting sympathizers is similar to the one described above by referring to FIG. 17. As a result, sympathizers having a taste for CD titles similar to that of the remarkable member will be selected.

Then, in Step S604, the CPU 21 accesses the data base specified by the remarkable member for requested recommendation. In the case of the above example, since "book" is specified for requested recommendation, the CPU 21 accesses the personal experience/sympathy data base 152 of the member that relates to books among the data bases stored in the hard disk 27 as shown in FIG. 34. Then, in Step S605, the CPU 21 generates a synthetic experience/sympathy list. The operation of generating the synthetic experience/sympathy list is similar to the one described above by referring to the flow chart of FIG. 25 except that the experience item is not CD titles but book titles. Therefore, as a result of this operation, a synthetic experience/sympathy list for book titles. Then, in Step S606, the CPU 21 generates a recommended experience list from the synthetic experience/sympathy list and outputs it to the terminal 11.

In this way, in the case of the above example, sympathizers having a taste for CDs similar to the taste of the remarkable member are selected and book titles that meet the taste of the sympathizers are retrieved so that finally, the list of the books is offered to the remarkable member as recommended experience list.

Thus, a recommended experience list 231 is prepared on te basis of the experience/sympathy element data E for the second category (the category of the request for recommendation) of the sympathizers having a taste similar to the remarkable member for the first category (the category for which sympathizers are selected) and offered to the requesting member.

Thus, the personal experience/sympathy record R is updated by the experience/sympathy element data E contributed by the member so that all pieces of information on all the categories of taste of the member can be collected to broaden the scope of service (so as to include the service of providing recommended experience lists) without difficulty.

While the present invention is described above mainly by referring to an example of service of providing information on experiences relating to CDs, the present invention is by no means limited thereto and can be used to provide services of various categories.

For the purpose of this letter of patent application, a system refers to one that comprises a plurality of apparatus and a plurality of means.

What is claimed is:

1. An information processing apparatus for selecting services to be provided to individual subscribers by way of a plurality of terminal units connected to the apparatus, said apparatus comprising:

memory means for storing personal information lists containing personal information including experiences on the services;

personal information extraction means for comparing the experience information contained in a remarkable piece of personal information and the experience information contained in each of the pieces of personal information contained in said personal information lists and extracting the pieces of personal information strongly related to said remarkable piece of personal information in accordance with a predetermined ambiguity in said remarkable piece of personal information; and selection means for selecting services to be provided to the terminal unit corresponding to said remarkable piece of personal information on the basis of the pieces of personal information extracted by said personal information extraction means.

2. An information processing apparatus according to claim 1, further comprising service providing means for providing a service selected by said selection means to said terminal unit corresponding said remarkable personal information.

3. An information processing apparatus according to claim 2, wherein said service providing means provides the service selected by said selection means to said terminal unit by way of network.

4. An information processing apparatus according to claim 1, wherein said experience information includes category information indicating the category of said service.

5. An information processing apparatus according to claim 4, wherein said selection means selects service on the commonness of the category information included in said remarkable personal information and the category information included in said personal information extracted by said personal information extraction means.

6. An information processing apparatus according to claim 4, wherein said experience information include cat-egory information indicating the category of said service and preference level information indicating the preference level for the service category indicated by said category information.

7. An information processing apparatus according to claim 6, wherein said selection means selects service on the basis of agreement between the category information included in said remarkable personal information and the category information included in said personal information extracted by said personal information extraction means and the portion of preference information showing agreement between the preference information included in said remarkable personal information and the sympathy preference information included in said personal information extracted by said personal information extraction means.

8. An information processing apparatus according to claim 1, further comprising personal information receiving means for receiving personal information transmitted from said plurality of terminal units.

9. An information processing apparatus according to to claim 1, further comprising synthetic personal information generation means for synthetically combining a plurality of pieces of personal information extracted by said personal information extracting means and generating synthetic personal information, wherein said selection means selects service to be provided to the terminal unit corresponding to said remarkable piece of personal information on the basis of said synthetic personal information.

10. An information processing apparatus according to claim 1, wherein said memory means being provided for each of a plurality of categories and having a plurality of memory sections for storing personal information lists for the respective categories and said personal information extraction means is adapted to extract personal information strongly related to said remarkable personal information on the basis of a plurality of pieces of information stored in one of said plurality of memory sections, while said selection means selects a plurality of pieces of personal information stored in another one of said plurality of memory sections different from the one utilized by said personal information extraction means and then also selects service on the basis of the selected personal information.

11. An information processing apparatus according to claim 1, wherein said selection means includes service extraction means for extracting one or more than one services on the basis of the personal information extracted by said personal information extraction means and restriction means for restricting the services to a predetermined number when said service extraction means extracts services more than said predetermined number.

12. An information processing method for selecting services to be provided to individual subscribers by way of a plurality of terminal units connected to the apparatus, said method comprising steps of:

storing personal information lists containing personal information including experiences on services;

comparing the experience information contained in a remarkable piece of personal information and the experience information contained in each of the pieces of personal information contained in said personal information lists and extracting the pieces of personal information strongly related to said remarkable piece of personal information in accordance with a predetermined ambiguity in said remarkable piece of peisonal information; and selecting services to be provided to the terminal unit corresponding to said remarkable piece of personal information on the basis of the pieces of personal information extracted in said step of extracting personal information.

13. An information processing system comprising a plurality of terminal units and an information processing apparatus for providing service information to said plurality of terminal units, each of said terminal units having:

input means for inputting experience information relating to said service information and request information requesting service information to said information processing apparatus;

first communication means for transmitting said experience information and said request information to said information processing apparatus and receiving said service information from said information processing apparatus by way of a network; and display means for displaying the service information received by said first communication means;

said information processing means having:

second communication means for receiving experience information and request information from said information processing apparatus and transmitting service information to said plurality of terminal units;

memory means for storing a personal information list containing personal information on a plurality of individuals including said service information transmitted from said first communication means of said plurality of terminal units and received by said second communication means;

remarkable personal information extraction means for extracting experience information contained in remarkable personal information relating to said terminal unit used for transmitting said request information from said memory means;

related personal information extraction means for extracting personal information strongly related within a predetermined ambiguity, to said remarkable personal information from each pieces of personal information contained in said personal information list by comparing said experience information contained in said remarkable personal information with experience information contained in each pieces of personal information contained in the personal information list stored in said memory means; said predetermined ambiguity being, in ambiguity in said remarkable piece of personal information; and selection means for selecting said service information for the terminal unit corresponding to said remarkable personal information on the basis of the personal information extracted by said related personal information extraction means;

said second communication means being adapted to transmit said service information selected by said selection means to said terminal unit used to transmit said request information by way of said network.

14. A recording medium storing an information processing program adapted to be read by a computer for selecting services to be provided to a plurality of terminal units;

said information processing program being for use for each of the individuals using said plurality of terminal units and adapted to carry out a processing operation comprising steps of:

storing personal information lists containing personal information including experiences on services;

comparing the experience information contained in a remarkable piece of personal information and the experience information contained in each of the pieces of personal information contained in said personal information lists and extracting the pieces of personal information strongly related to said remarkable piece of personal information; within a predetermined ambiguity in said remarkable piece of personal information; and selecting services to be provided to the terminal unit corresponding to said remarkable piece of personal information on the basis of the pieces of personal information extracted in said step of extracting personal information.

15. An information processing apparatus according to claim 1, wherein said personal information extraction means extracts said pieces of personal information that is strongly related to said remarkable piece of personal information in accordance with predetermined ambiguity in said pieces of personal information.

16. An information processing apparatus for providing a recommendation of an experience item to a terminal comprising:

receiving means for receiving a preference level of said experience item input on said terminal:

memory means for storing said preference level in accordance with said experience item:

evaluate means for evaluating an ambiguity of said preference level by calculating a difference of said preference level from a predetermined level, extract means for extracting said experience item stored in said memory means based upon a result from said evaluate means; and sending means for sending said experience item extracted by extract means to said terminal.

* * * * *